US009614837B2

(12) United States Patent
Archer et al.

(10) Patent No.: US 9,614,837 B2
(45) Date of Patent: Apr. 4, 2017

(54) SYSTEMS AND METHODS FOR VERIFYING HUMAN INTERACTION WITH A COMPUTER INTERFACE

(71) Applicant: Verizon Patent and Licensing Inc., Arlington, VA (US)

(72) Inventors: Steven T. Archer, Dallas, TX (US); Robert A. Clavenna, II, Lucas, TX (US); Kristopher Pate, Flower Mound, TX (US); Paul V. Hubner, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/470,267

(22) Filed: Aug. 27, 2014

(65) Prior Publication Data
US 2016/0065559 A1 Mar. 3, 2016

(51) Int. Cl.
*G06F 21/36* (2013.01)
*H04L 29/06* (2006.01)
(52) U.S. Cl.
CPC ............ *H04L 63/083* (2013.01); *G06F 21/36* (2013.01); *H04L 63/0861* (2013.01); *G06F 2221/2133* (2013.01)
(58) Field of Classification Search
CPC ..... G06F 2221/2133; G06F 2221/2103; G06F 21/36; G06F 3/04842; H04L 63/1433; H04L 63/10
USPC .......................................................... 726/8
See application file for complete search history.

(56) References Cited

U.S. PATENT DOCUMENTS

| 8,542,251 | B1* | 9/2013 | Gossweiler, III | G06F 3/04883 345/649 |
| 8,904,493 | B1* | 12/2014 | Dibble | H04L 63/08 726/4 |
| 2009/0113294 | A1* | 4/2009 | Sanghavi | G06F 17/211 715/269 |
| 2010/0293330 | A1* | 11/2010 | Maloney | G06T 13/80 711/118 |
| 2011/0023110 | A1* | 1/2011 | Freund | G06F 21/36 726/16 |
| 2013/0014235 | A1* | 1/2013 | Antypas, III | G06F 21/35 726/5 |

(Continued)

OTHER PUBLICATIONS

WPI, PowerPoint 2010: Animation and Slide Transitions, 2011, https://www.wpi.edu/Academics/ATC/Collaboratory/HowTo/PowerPoint/animation.html.*

(Continued)

*Primary Examiner* — Tae Kim
*Assistant Examiner* — Khang Do

(57) ABSTRACT

Exemplary methods and systems for verifying human interaction with a computer interface are described herein. An exemplary method includes a human-interaction verification system detecting a request by an access device to access network-based content, providing, for display by the access device, a visually dynamic representation of one or more security images associated with a passcode in response to the access request, receiving, by way of the access device, challenge-response input associated with the visually dynamic representation of the one or more security images, and performing an access operation based at least in part on a comparison of the challenge-response input to the passcode.

18 Claims, 13 Drawing Sheets

(56) References Cited

U.S. PATENT DOCUMENTS

| | | | | |
|---|---|---|---|---|
| 2013/0276125 A1* | 10/2013 | Bailey | ............... | H04L 63/1433 |
| | | | | 726/25 |
| 2014/0289828 A1* | 9/2014 | Gross | ............... | A63F 13/12 |
| | | | | 726/6 |
| 2015/0294687 A1* | 10/2015 | Buick | ............... | G11B 27/036 |
| | | | | 386/280 |

OTHER PUBLICATIONS

GCF, PowerPoint 2010 Applying Transitions, 2011, http://www.gcflearnfree.org/powerpoint2010/6.2.*

* cited by examiner

SYSTEMS AND METHODS FOR VERIFYING HUMAN INTERACTION WITH A COMPUTER INTERFACE

BACKGROUND INFORMATION

With advances in network technologies, users are able to interact in many different ways with services and content provided via networks. For example, a user of a computing device is able to purchase goods from online retailers, post comments on online content such as news articles or blogs, participate in message boards, and participate in user surveys and polls. Through such interactive network-based services and content, users may interact not only with computers and software applications that provide network services and content, but also with other users, thus providing a rich experience for the users.

Unfortunately, automated software applications have been developed to mimic human interactions with computer interfaces through which network-based services and content are accessed, often for malicious purposes. For example, malicious bots may add large amounts of spam, such as advertising links, on comment boards and other online content, repeatedly vote in polls to skew poll results, carry out denial of service attacks, harvest email addresses for spamming, and artificially increase traffic numbers for certain websites or online content. While some security measures have been developed to detect non-human interaction with computer interfaces and deny access to network-based services and content by non-human users, malicious bots are increasingly able to bypass conventional security measures.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
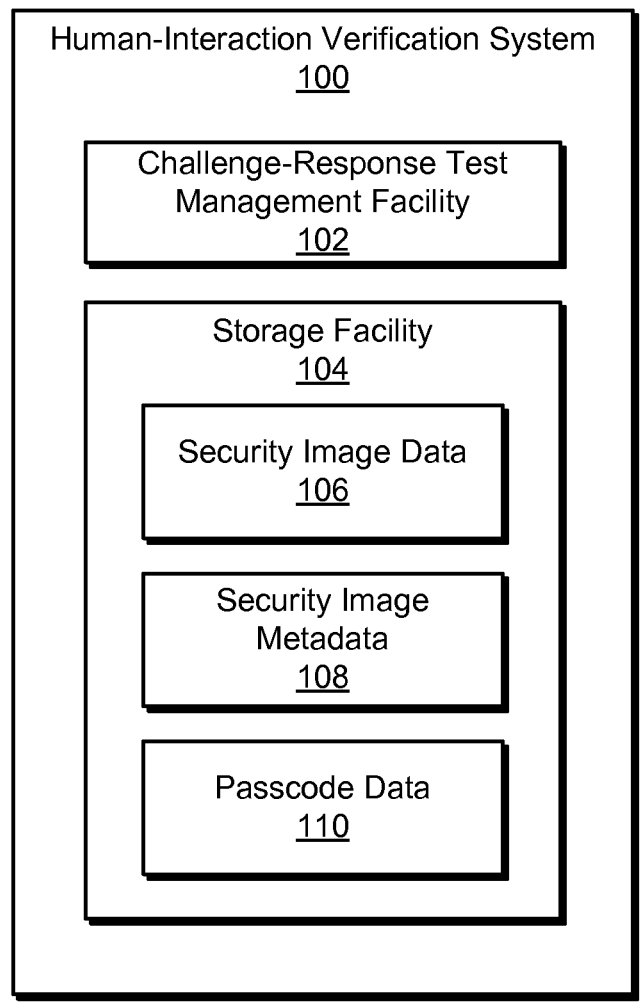
FIG. 1 illustrates an exemplary human-interaction verification system according to principles described herein.

Methods and systems for verifying human interaction with a computer interface are described herein. For example, as will be described below, a human-interaction verification system may detect a request by an access device to access network-based content, provide, for display by the access device, a visually dynamic representation of one or more security images associated with a passcode in response to the request, receive, by way of the access device, challenge-response input associated with the visually dynamic representation of one or more security images, and perform at least one access operation based at least in part on a comparison of the challenge-response input to the passcode.

To illustrate, the human-interaction verification system may detect an access request by an access device to access network-based content from a content provider. In response, the human-interaction verification system may provide a challenge-response test that requires a visually dynamic perception task to be performed in order to satisfy the challenge-response test. For example, the human-interaction verification system may provide, for display by the access device, a visually dynamic representation of one or more security images associated with a passcode. The human-interaction verification system may receive challenge-response input associated with the visually dynamic representation of the one or more security images (e.g., a passcode guess) and compare the challenge-response input with the passcode. The human-interaction verification system may then perform one or more access operations based at least in part on the results of the comparison, such as by allowing access to the network-based content if the challenge-response input matches the passcode or denying access to the network-based content if the challenge-response input does not match the passcode.

The visually dynamic representation of the one or more security images may be viewable over time (e.g., over a continuous time period during which the visually dynamic representation is presented) by a human user interacting with a computer interface and may facilitate the human user ascertaining the passcode based on the visually dynamic representation of the one or more security images. On the other hand, a non-human entity, such as a bot or other automated script that uses screen capture and/or image recognition technologies, interacting with a computer interface may be unable to ascertain the passcode from the visually dynamic representation of the one or more security images.

A computer interface may include any type of computer-implemented interface (e.g., a software, firmware, middleware, and/or hardware interface) that allows a human user or non-human entity to communicate with (e.g., provide input to, receive output from, and/or otherwise interact with) one or more computing devices. A computer interface may include and/or utilize any communication technologies suitable to support interaction by a human or non-human entity with a computing device, application, and/or other computing component. For example, a computer interface may include a graphical user interface, a communication interface (e.g., including one or more communication protocols for a communication interface), a network interface, an application programming interface ("API"), an operating system, a database interface (e.g. a Structured Query Language ("SQL")-based interface), and/or any other interface to a computing device, application, and/or other computing component. A computer interface may be interacted with by a human and/or non-human entity to access network-based content provided by a content provider.

The human-interaction verification system may selectively grant human users interacting with a computer interface access to network-based content and deny non-human entities access to the network-based content. Examples of visually dynamic representations of one or more security images associated with a passcode, and how the visually dynamic representations may facilitate a determination, by the human-interaction verification system, as to whether a human user or a non-human entity is interacting with a computer interface to request access to network-based content, are described herein.

FIG. 1 illustrates an exemplary human-interaction verification system 100 ("system 100"). As shown, system 100 may include, without limitation, a challenge-response test management facility 102 and a storage facility 104 selectively and communicatively coupled to one another. It will be recognized that although facilities 102 and 104 are shown to be separate facilities in FIG. 1, facilities 102 and 104 may be combined into fewer facilities, such as into a single facility, or divided into more facilities as may serve a particular implementation.

Challenge-response test management facility 102 may detect a request for access to network-based content. As used herein, a "request for access" or "access request" may refer to a request received by way of an access device to access network-based content. As also used herein, "network-based content" may refer to any content or service that is provided by a content provider and/or any other entity and may be available for access by an access device (e.g., a computing device) by way of a network. Network-based content may include any content or services available for experiencing by a user of an access device. Network-based content may be in any format that may be accessed and processed by an access device. For example, network-based content may include media content in any format (e.g., video, audio, images, etc.), documents, text, communications (e.g., audio calls, video calls, messaging, chats, interactive communications, etc.), content applications (e.g., software applications), and/or any other content that may be accessed and processed by an access device. Examples of network-based content may include, without limitation, websites, news articles, blogs, comment boards, user polls and surveys, online retail services, network storage services, cloud storage services, financial services, social media services, social networking services, and software applications.

Network-based content may be accessed in any suitable manner. For example, network-based content may be accessed by an access device by downloading, presenting, displaying, streaming, printing, executing an application, or otherwise outputting the network-based content. A human user or a non-human entity interacting with a computer interface may provide input to, or by way of, the access device to indicate a desire to access network-based content. For example, a human user may input a Uniform Resource Locator ("URL") address or select a displayed hyperlink in a browser application running on the access device in order to access and view a website.

Challenge-response test management facility 102 may detect a request for access to network-based content in any suitable way. For example, challenge-response test management facility 102 may receive a request to access network-based content from an access device. As another example, challenge-response test management facility 102 may receive a notification of a request to access network-based content. For instance, challenge-response test management facility 102 may receive a notification of the access request from a network-based content provider, which may have received an access request from an access device and sent the notification of the access request to challenge-response test management facility 102.

In response to detecting the request for access or a notification of a request for access, challenge-response test management facility 102 may obtain and use a challenge-response test to manage access to the network-based content. As used herein, a "challenge-response test" may include a passcode and any security image or set of security images associated with the passcode. A "passcode" may refer to any characters, text, letters, numbers, symbols, signs, marks, figures, or combinations thereof (hereinafter referred to individually or collectively as "characters"), that are capable of being inputted by a human user interacting with an access device. A passcode may be stored in storage repository 104 as passcode data 110 representative of the passcode. Challenge-response test management facility 102 may also obtain the challenge-response test at any other suitable time as may serve a particular implementation. For example, challenge-response test management facility 102 may obtain and store the challenge-response test in storage repository 104 prior to detecting the request for access. For example, the challenge-response test may be pre-defined and pre-stored in storage repository 104 for use when a request for access is detected by challenge-response test management facility 102.

The challenge-response test may be administered by challenge-response test management facility 102 to require a visually dynamic perception task to be successfully performed in order to gain access to network-based content. For example, challenge-response test management facility 102 may provide, for display by the access device, a visually dynamic representation of one or more security images associated with the passcode, as will be described in more detail below. A user may then be allowed access to network-based content by providing, by way of the access device, challenge-response input matching the passcode associated with one or more security images provided for display by the access device.

A security image included in the challenge-response test may include a graphical representation of all or a portion of the characters included in the passcode. For example, if the passcode included in the challenge-response test is "HOMERUN," the security image may depict a graphical representation of the word "HOMERUN." In other words, the characters of the passcode may be provided in an image format rather than a text format (e.g., a format that uses character encoding). Additionally or alternatively, the security image may include one or more graphical objects. In certain examples, the one or more graphical objects may be included in the security image in addition to the graphical representation of the passcode characters. For instance, a security image may include one or more graphical objects forming a background, a border, a watermark, and/or any other design feature in addition to the graphical representation of the passcode characters. In other examples, one or more graphical objects may be included in the security image in place of, or in addition to, the graphical representation of the passcode characters to visually depict or represent the content or context of the passcode. For instance, if the passcode is "FLOWERS," the one or more graphical objects included in the security image may depict a bouquet of flowers.

The security image may have one or more design effects applied to the graphical representation of the passcode characters and/or the one or more graphical objects included in the security image. Any one or more design effects may be applied as may suit a particular implementation. For example, the design effects may include, without limitation, character font, font size, font effects (e.g., underline, bold, italics, strikethrough, outline), character spacing, line spacing, character alignment, case, shadowing, distortion, skew, rotation, waving, fill, color, line weight, line style, black/white negative, color negative, angle of view, warping, grayscale, hue, color, saturation, transparency, brightness, position, and/or any other design properties.

Although the security image has been described as including a graphical representation of the passcode characters and/or one or more graphical objects depicting the passcode, any graphical objects, designs, layouts, design effects, or features may be included in the security image that are capable of allowing a human user viewing the security image to ascertain or decipher, based on the security image, the passcode associated with the security image. In certain examples in which the security image is part of a set of multiple security images associated with the passcode, the security image may include one or more such elements that are capable of allowing a human user viewing the security image to ascertain or decipher at least part of the passcode.

In some examples, a security image may include a mosaic of a plurality of subportions of a plurality of security images. For example, a single security image graphically depicting a truck may have an upper-left corner subportion depicting a milk truck, an upper-right corner subportion depicting a pickup truck, a lower-left corner subportion depicting a semi-trailer truck, and a lower-right corner subportion depicting a flatbed truck. A human brain may be able to recognize the various subportions and internally piece them together to determine the passcode associated with the security image. On the other hand, a mosaic-type security image may be difficult for a bot to analyze in order to determine the passcode associated with the security image because a bot, unlike humans, cannot easily identify a correlation among subportions of different security images included in a mosaic-type security image.

Data representative of the security image may be maintained at any suitable location, including as security image data 106 stored in storage repository 104. The security image data 106 representative of the security image may be maintained in any suitable data format, such as a raster-based, vector-based, or other suitable data format, including, without limitation, GIF, TIFF, JPEG, BMP, and PNG data formats.

Challenge-response test management facility 102 may obtain a challenge-response test in any suitable way. For example, challenge-response test management facility 102 may obtain a passcode and then obtain, based on the passcode, one or more security images. Alternatively, challenge-response test management facility 102 may obtain one or more security images and then obtain, based on the one or more security images, a passcode.

In certain implementations, challenge-response test management facility 102 may obtain a passcode and then obtain, based on the passcode, one or more security images in any suitable manner as may serve a particular implementation. In certain examples, for instance, a passcode may be obtained from a repository of passcodes or potential passcodes, such as from a repository of words (e.g. a dictionary or a specialized group of words) stored in repository 104. In certain other examples, a passcode may be obtained from a source external of system 100, such as from a third-party provider. In certain other examples, challenge-response test management facility 102 may obtain the passcode by generating the passcode, such as from a plurality of characters and/or words and/or in accordance with a passcode generation heuristic.

Challenge-response test management facility 102 may obtain one or more security images based on the obtained passcode in any suitable manner. For example, challenge-response test management facility 102 may generate one or more security images graphically representing the passcode characters, as described above. The generated security images may be stored in storage repository 104 as security image data 106.

Additionally or alternatively, challenge-response test management facility 102 may obtain one or more pre-generated images and associate the pre-generated images with the passcode. For example, one or more security images may be selected from a set of pre-generated images having metadata (described below in more detail), such as descriptors or identifiers, that match the obtained passcode. Pre-generated images may be stored in storage repository 104, or they may be obtained from a third party source, such as a stock image provider. The one or more pre-generated security images may then be stored in storage repository 104 for use with the passcode.

In certain implementations, challenge-response test management facility 102 may obtain one or more security images and then obtain, based on the one or more security images, a passcode in any suitable manner as may suit a particular implementation. In certain examples, for instance, challenge-response test management facility 102 may obtain one or more pre-generated images, as explained above, and one or more security images may be selected from a set of pre-generated images. The obtained one or more pre-generated security images and/or the selected one or more security images may be stored in storage repository 104 as security image data 106.

A passcode may be obtained based on the obtained one or more security images in any suitable manner. For example, the passcode may be obtained from security image metadata 108 associated with the obtained one or more security image and stored in storage repository 104. For instance, storage repository 104 may include security image data 106 representative of the one or more obtained security images and security image metadata 108 associated with the security image data 106. Security image metadata 108 may include information associated with or descriptive of the content and/or context of the associated security image(s). For example, storage repository 104 may include security image data 106 representative of a security image depicting a truck. Security image metadata 108 associated with the security image may include information describing the truck, such as a color of the truck (e.g., "red"), the number of wheels shown (e.g., "five"), and objects shown on the side of the truck (e.g., "flowers"). Challenge-response test management facility 102 may select an item of security image metadata 108 from storage repository 104 for use as the passcode (e.g., the word "red").

In certain examples, the security image metadata 108 may also include a security question based on each descriptive item included in the security image metadata 108. For example, the security question associated with a "red" metadata value may be "What is the color of the object shown?" Additionally or alternatively, the security question may be included in the security image (e.g., as a graphical depiction of the characters of the security question).

The security image may be associated with the passcode in any suitable manner. For example, security image data 106 and/or security image metadata 108 may include an identifier specifying or linking to the passcode data 110 with which the security image is associated. Alternatively, the passcode data 110 may include an identifier specifying or linking to the security image data 106 with which the passcode is associated. Alternatively, a separate data object may include data representing the passcode and the security image or data indicating a link between the security image and the passcode, such as links to the security image in the security image data 106 and to the passcode in the passcode data 110.

The challenge-response test may include a passcode associated with a single security image or a plurality of security images. For example, a single passcode may be associated with a first security image and a second security image that is visually different from the first security image. For instance, the first security image may depict a graphical representation of the passcode characters stylized with a first set of design effects, and the second security image may depict a graphical representation of the passcode characters stylized with a second set of design effects. As an example, a passcode of "HOMERUN" may be associated with a first security image that graphically depicts the passcode characters included in the passcode "HOMERUN" in an italicized Times New Roman font and positioned in the center of a security image display window. The passcode "HOMERUN" may also be associated with a second security image that graphically depicts the passcode characters included in the passcode "HOMERUN" in a bold, cursive font and positioned at a bottom left corner of the security image display window.

In another example, the first security image may include graphical objects representing the passcode, and the second security image may include different graphical objects representing the passcode. For example, the passcode "FLOWERS" may be associated with a first security image depicting a bouquet of red roses and a second security image depicting a garden of yellow tulips.

Challenge-response test management facility 102 may use the obtained challenge-response test to manage access to the network-based content associated with an access request. To this end, challenge-response test management facility 102 may provide, for display by an access device, a visually dynamic representation of one or more security images associated with the passcode. Examples of providing, for display by an access device, the visually dynamic representation of one or more security images associated with the passcode will now be described.

In certain examples, challenge-response test management facility 102 may provide a visually dynamic representation of one or more security images associated with a passcode by providing a plurality of subportions of a security image for display by an access device over time such that different views of the security image are displayed over time (e.g., different views of the security image are displayed at discrete times within a period of time). For example, challenge-response test management facility 102 may provide the visually dynamic representation of one or more security images associated with the passcode by providing a first subportion of a security image for display by an access device during a first time segment and a second subportion of the security image for display by the access device during a second time segment. A subportion of the security image may refer to a region of the security image that depicts less than the entire security image.

Figure 2:
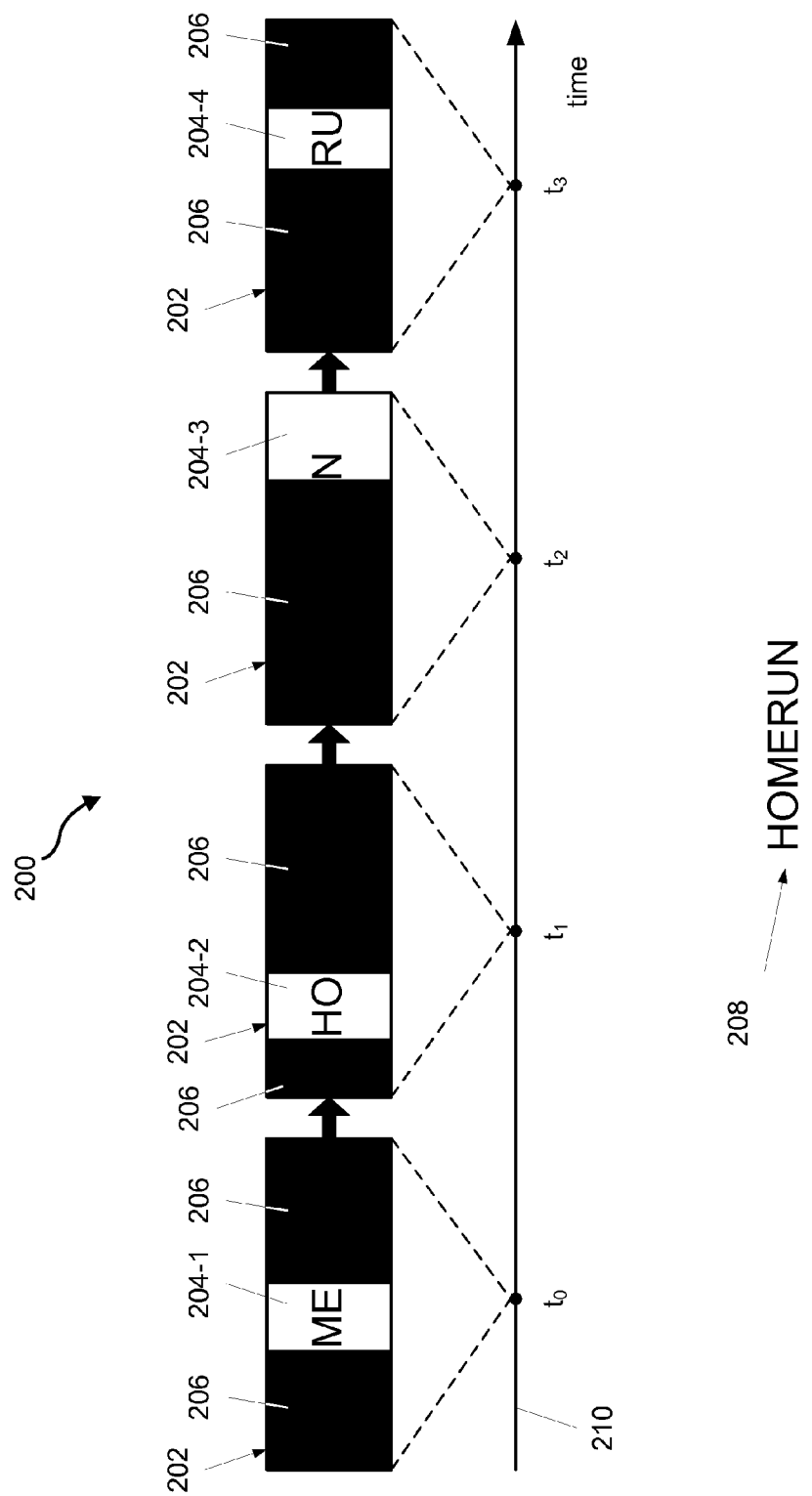
FIGS. 2-7 illustrate exemplary visually dynamic representations of one or more security images associated with a passcode according to principles described herein.

FIG. 2 illustrates an exemplary visually dynamic representation 200 of a plurality of subportions 204 (e.g., subportions 204-1 through 204-4) of a single security image associated with a passcode 208. In this illustrated example, passcode 208 is "HOMERUN" and is associated with a security image graphically depicting the characters of "HOMERUN." As shown, a first subportion 204-1 of the security image, a second subportion 204-2 of the security image, a third subportion 204-3 of the security image, and a fourth subportion 204-4 of the security image may be provided for display by an access device within a display window 202 in turn at different times (e.g., times $t_0$, $t_1$, $t_2$, and $t_3$) along a time axis 210. The subportions 204 of the security image that are displayed within display window 202 may periodically change over time according to a display scheme (e.g., by displaying different subportions 204 at different times), as described below in more detail.

First subportion 204-1 of the security image may be provided for display in display window 202 from time $t_0$ to time $t_1$. As shown, first subportion 204-1 of the security image graphically depicts only the characters "ME" of passcode 208. While first subportion 204-1 is displayed, non-display regions 206 do not display or depict any other portion of the security image associated with passcode 208.

Second subportion 204-2 of the security image may be provided for display in display window 202 from time $t_1$ to time $t_2$. As shown, second subportion 204-2 of the security image graphically depicts only the characters "HO" of passcode 208. While second subportion 204-2 is displayed, non-display regions 206 do not display or depict any other portion of the security image associated with passcode 208.

Third subportion 204-3 of the security image may be provided for display in display window 202 from time $t_2$ to time $t_3$. As shown, third subportion 204-3 of the security image graphically depicts only the character "N" of passcode 208. While third subportion 204-3 is displayed, non-display region 206 does not display or depict any other portion of the security image associated with passcode 208.

Fourth subportion 204-4 of the security image may be provided for display in display window 202 beginning at time $t_3$. As shown, fourth subportion 204-4 of the security image graphically depicts only the characters "RU" of passcode 208. While fourth subportion 204-4 is displayed, non-display regions 206 do not display or depict any other portion of the security image associated with passcode 208.

Although FIG. 2 shows subportions 204 of the security image as being rectangular and depicting one or more whole characters of passcode 208, each subportion 204 of the security image may be any other size and/or shape. For example, subportions 204 may be any geometrical shape (e.g., rectangle, square, circle, oval, triangle, etc.), puzzle piece shape, or amorphous shape. Moreover, different subportions that are displayed at different times can spatially overlap one another. Furthermore, while FIG. 2 shows only four subportions 204, a visually dynamic representation of the security image may include any quantity of subportions 204. The shapes, sizes, and quantity of subportions 204 of the security image may be determined randomly, in accordance with a predefined randomization algorithm, or based on a pre-defined template for subdividing a security image into a plurality of subportions. Subportions 204 may additionally or alternatively be configured to depict any part of the security image. For example, subportions 204 need not depict whole characters, but may also depict partial characters. Additionally, non-display portions 206 are not limited to a single, solid black color or shape, as shown in FIG. 2, but may have any color, shading, shape, and/or pattern as may suit a particular implementation. Moreover, while FIG. 2 illustrates the security image as a single security image, the security image may also be a mosaic-type security image, as described above.

Subportions 204 of the security image may also be displayed for any duration of time and in any temporal order as may suit a particular implementation. For example, the duration of a time segment may be substantially equal to or less than a duration of a single frame of a refresh-based, high-frame-rate display device associated with the access device, at a minimum, or several seconds or more, as may suit a particular implementation. As shown in FIG. 2, first subportion 204-1 may be displayed for a first time segment ranging from time $t_0$ to time $t_1$, second subportion 204-2 may be displayed for a second time segment ranging from time $t_1$ to time $t_2$, third subportion 204-3 may be displayed for a third time segment ranging from time $t_2$ to time $t_3$, and fourth subportion 204-4 may be displayed for a fourth time segment beginning at time $t_3$. Different time segments may also overlap so that multiple subportions of the security image may be displayed simultaneously. The duration of each time segment may be determined according to a display scheme, as described below in more detail.

In certain examples, sequential presentation of subportions 204 at a sufficiently high frame rate may result in a human viewer perceiving a single composite image. If subportions 204 depict, in the aggregate, substantially all of the security image, the single composite image viewed by the human viewer may appear to be the security image. If the transmission rate is low, or if the subportions 204 depict, in the aggregate, substantially less than all of the security image, the human viewer may not perceive a composite image equal to the security image but may nevertheless determine passcode 208 due to the ability of the human brain to retain in memory and piece together the viewed subportions 204. For example, if subportions 204 depict only a partial view of the security image (e.g., only subportions 204-1, 204-2, and 204-3, but not subportion 204-4), a human viewer may still be able to "fill in" the missing information (e.g., the portion depicted by subportion 204-4) and determine passcode 208.

On the other hand, the sequential presentation of subportions 204 of the security image may prevent, or at least make difficult, automatic determination of passcode 208 by non-human entities, such as bots or automated scripts that employ screen capture and image recognition technologies. A screen capture taken over any period of time during which less than all of the security image is depicted will contain insufficient information for a bot to determine passcode 208. For example, a screen capture taken from time $t_0$ up to time $t_2$ would capture only first subportion 204-1 ("ME"), second subportion 204-2 (e.g., "HO"), and corresponding non-display portions 206, which would be insufficient information for a non-human entity to ascertain passcode 208.

In certain examples, an obfuscation image may also be displayed between the display of any two of the subportions 204. The duration of display of the obfuscation image may be any length of time conducive to the obfuscation image being captured by a non-human entity employing screen capture and image recognition technology, but may also be short enough in duration so as to not affect a human viewer's ability to identify and determine the passcode 208 from the visually dynamic representation of the subportions 204 of the security image. The obfuscation image may have any design or pattern that may confuse a non-human entity and further render the passcode 208 undecipherable to the non-human entity. For instance, the obfuscation image may include any solid-color image or patterned image (e.g., swirls, bars, dots, cross-hatch, etc.). For example, although not shown in FIG. 2, a solid-black image may be displayed in window 202 at a time immediately prior to time $t_3$. In certain examples, a plurality of obfuscation images may be provided for display by the access device. To further prevent a non-human entity automatically ascertaining the passcode, the obfuscation images may be provided such that the subportions 204 of the security image displayed temporally between the obfuscation images visually depict, in the aggregate, less than all of the security image.

A visually dynamic representation of a plurality of subportions of a security image may be provided in accordance with a display scheme, which may define how at least one attribute of the subportions of the security image changes during a visually dynamic representation of the plurality of security images. The attributes that may change include one or more of a shape, a size, a position, an order of display, and a display duration of subportions of the security image, as well as the quantity of subportions displayed. In certain examples, the display scheme may be randomized. Alternatively, the display scheme may be determined according to a predefined algorithm, pattern, or template.

In certain examples, the visually dynamic representation of the plurality of subportions of the security image may be provided in display cycles. A display cycle may include a sequential display of a set of subportions. In certain examples, a display cycle may depict, in the aggregate, substantially all of the security image. For example, as shown in FIG. 2, a display cycle may include display of subportions 204-1, 204-2, 204-3, and 204-4, which together depict all of the security image associated with passcode 208. In other examples, a display cycle may depict, in the aggregate, less than all of the security image. For example, a display cycle may include display of subportions 204-1, 204-2, and 204-3, but not 204-4. Additionally or alternatively, a display cycle may be a set of subportions 204 that are displayed during a predetermined amount of time (e.g., ten seconds).

The display cycle may repeat indefinitely or for any suitable number of times. In certain examples, the display cycle may be set to repeat automatically, or it may be set to repeat in response to receiving input from the access device to repeat the display cycle (e.g., user input to replay the display cycle). A repeating display cycle may allow a human viewer to view the visually dynamic representation of the security image for as long as may be necessary for the human viewer to ascertain the passcode 208. Alternatively, the visually dynamic representation may terminate after a first display cycle or after another predetermined number of cycles.

Each display cycle may have any display scheme as may suit a particular implementation. Any one or more display cycles may have the same display scheme, or they may have different display schemes. For example, a display scheme of a second display cycle may be different from a display scheme of a first display cycle.

Challenge-response test management facility 102 may provide the visually dynamic representation of subportions 204 of the security image for display by the access device associated with the access request in any suitable manner. For example, challenge-response test management facility 102 may transmit data representative of the plurality of subportions 204 ("subportion image data") to the access device associated with the access request. In certain examples, challenge-response test management facility 102 may stream subportion image data to the access device in accordance with a display scheme. For example, subportion image data representative of subportion 204-1 may be transmitted to the access device at time to (or immediately prior thereto, accounting for transmission delays), subportion image data representative of subportion 204-2 may be transmitted to the access device at time $t_1$, subportion image data representative of subportion 204-3 may be transmitted to the access device at time $t_2$, and subportion image data representative of subportion 204-4 may be transmitted to the access device at time $t_3$.

Alternatively, subportion image data may be transmitted to the access device with instructions for displaying the subportion image data in accordance with a display scheme.

The access device may optionally include a client software application configured to receive the subportion image data and provide the visually dynamic representation of the subportions 204 represented by the transmitted subportion image data in accordance with the display scheme.

In certain other examples of providing a visually dynamic representation of one or more security images associated with a passcode, challenge-response test management facility 102 may provide a visually dynamic representation of a plurality of security images associated with the passcode. This may include providing a plurality of security images for display over time (e.g., different security images are displayed at discrete times within a period of time). For example, a first security image may be provided for display by an access device during a first time segment, and a second security image may be provided for display by the access device during a second time segment.

Figure 3:
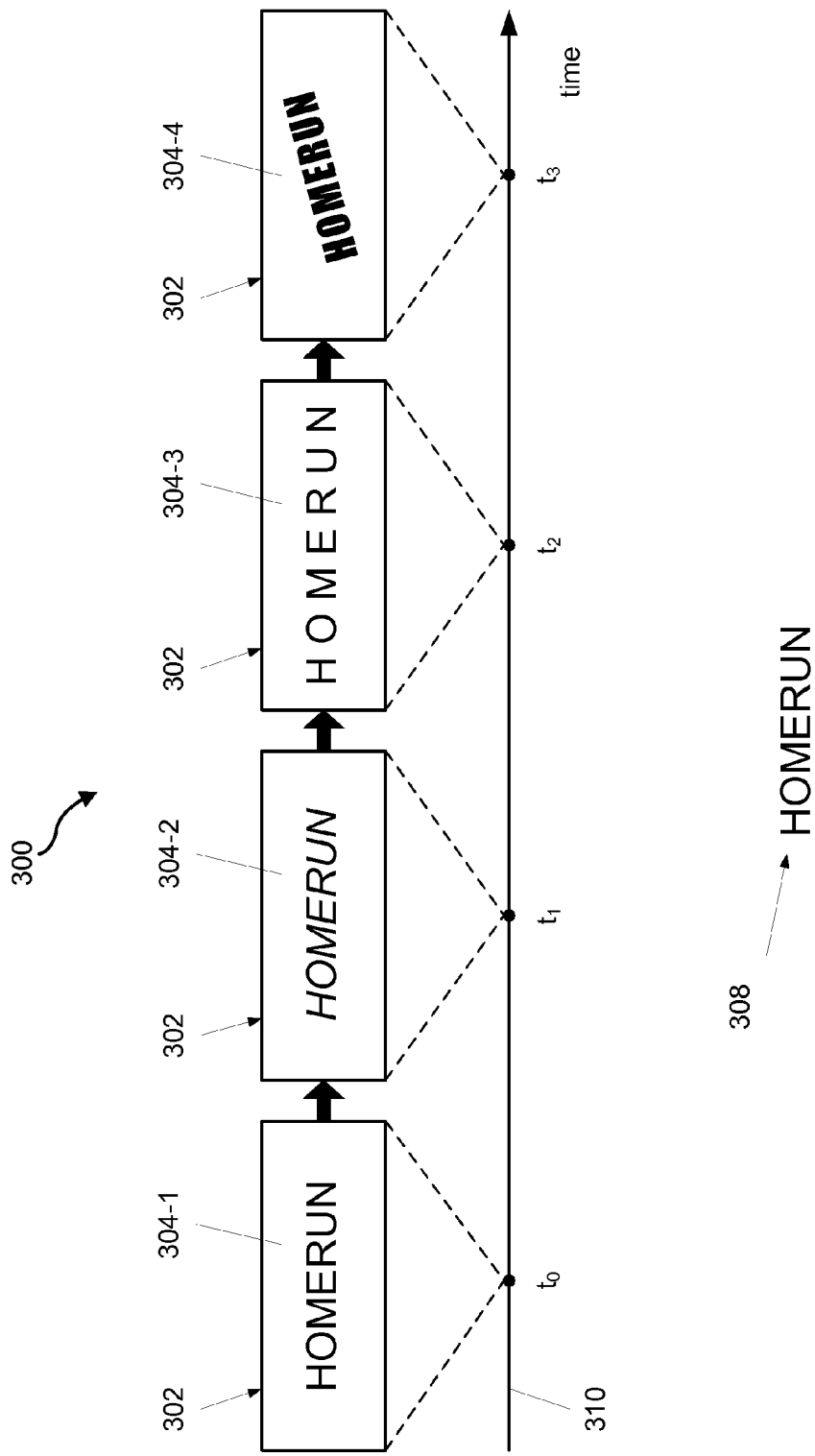

FIG. 3 illustrates an exemplary visually dynamic representation 300 of a plurality of security images 304 (e.g., security images 304-1 through 304-4) associated with a passcode 308. In the illustrated example, passcode 308 is "HOMERUN" and is associated with a plurality of security images 304 graphically depicting the characters of "HOMERUN." As shown, a first security image 304-1, a second security image 304-2, a third security image 304-3, and a fourth security image 304-4 may be provided for display by an access device within a display window 302 in turn at different times (e.g., times $t_0$, $t_1$, $t_2$, and $t_3$) along a time axis 310. The security image 304 that is displayed within display window 302 may periodically change over time according to a display scheme (e.g., by displaying different security images 304 at different times), as described below in more detail.

In the example of FIG. 3, first security image 304-1 may be provided for display in display window 302 at time $t_0$. As shown, first security image 304-1 depicts the characters of passcode 308 with a first set of design effects. For example, the characters of passcode 308 depicted in first security image 304-1 are shown in Arial font with normal styling.

Second security image 304-2 may be provided for display in display window 302 at time $t_1$. As shown, second security image 304-2 depicts the characters of passcode 308 with a second set of design effects. For example, the characters of passcode 308 depicted in second security image 304-2 are shown in italicized Arial font.

Third security image 304-3 may be provided for display in display window 302 at time $t_2$. As shown, third security image 304-3 depicts the characters of passcode 308 with a third set of design effects. For example, the characters of passcode 308 depicted in third security image 304-3 are shown in normal Arial font with expanded character spacing.

Fourth security image 304-4 may be provided for display in display window 302 at time $t_3$. As shown, fourth security image 304-4 depicts the characters of passcode 308 with a fourth set of design effects. For example, the characters of passcode 308 depicted in fourth security image 304-4 are shown in Impact font and rotated counter-clockwise by about 25 degrees.

The design effects of the security images 304 may be determined in any suitable manner. For example, the design effects may be selected randomly, in accordance with a design effect selection heuristic, or based on a pre-defined display scheme.

Security images 304 may be displayed for any duration of time and in any temporal order as may suit a particular implementation. For example, as shown in FIG. 3, first security image 304-1 may be displayed for a first time segment ranging from time $t_0$ to time $t_1$, second security image 304-2 may be displayed for a second time segment ranging from time $t_1$ to time $t_2$, third security image 304-3 may be displayed for a third time segment ranging from time $t_2$ to time $t_3$, and fourth security image 304-4 may be displayed for a fourth time segment beginning at time $t_3$. The duration of each time segment may be determined in any suitable manner as described herein. For example, the duration of each time segment may be determined according to a predefined randomization algorithm, display scheme, or template. In certain examples, the duration of a time segment may be substantially equal to or less than a duration of a single frame of a refresh-based, high-frame-rate display device associated with the access device, at a minimum, or several seconds or more, as may suit a particular implementation.

In certain examples, sequential presentation of first security image 304-1, second security image 304-2, third security image 304-3, and fourth security image 304-4 at a sufficiently high frame rate may result in a human viewer perceiving a dynamic, moving image. For example, the characters of passcode 308 may appear to be moving within display window 302. Sequential presentation of first security image 304-1, second security image 304-2, third security image 304-3, and fourth security image 304-4 at a low frame rate may result in a human viewer perceiving a periodically changing set of static images. In either case, a human viewer may be able to ascertain passcode 308 due to the ability of the human brain to visually perceive and recognize the characters included in the plurality of security images 304. On the other hand, the sequential presentation of security images 304 may prevent, or at least make difficult, automatic determination of passcode 308 by non-human entities such as bots and automated scripts that utilize multiple screen captures and image recognition technologies. For example, a plurality of screen captures taken from time $t_0$ to time $t_3$, when compiled into a single composite image for image recognition processing, would create an unrecognizable blur resulting from the aggregation of security images 304-1, 304-2, and 304-3 and would be insufficient for a non-human entity to ascertain passcode 308.

A visually dynamic representation of a plurality of security images may be provided in accordance with a display scheme, which may define how the design effects of the plurality of security images and/or the display duration of the plurality of security images changes during the visually dynamic representation of the plurality of security images. In certain examples, the display scheme may be randomized. Alternatively, the display scheme may be determined according to a predefined algorithm or template.

Challenge-response test management facility 102 may provide the visually dynamic representation of the plurality of security images in any suitable manner. For example, challenge-response test management facility 102 may transmit security image data 106 representative of the plurality of security images 304 to the access device associated with the access request. In certain examples, challenge-response test management facility 102 may stream image data 106 to the access device in accordance with a display scheme. For example, security image data representative of security image 304-1 may be transmitted to the access device at time to (or immediately prior thereto, accounting for transmission delays), security image data representative of security image 304-2 may be transmitted to the access device at time $t_1$, security image data representative of security image 304-3 may be transmitted to the access device at time $t_2$, and security image data representative of security image 304-4 may be transmitted to the access device at time $t_3$.

Alternatively, security image data representative of the plurality of security images may be transmitted to the access device with instructions for displaying the plurality of security images in accordance with a display scheme. The access device may optionally include a client software application configured to receive the security image data and provide the visually dynamic representation of the plurality of security images in accordance with the display scheme.

In certain other examples of providing a visually dynamic representation of one or more security images associated with a passcode, a combination of any of the above-described examples may be used. For example, challenge-response test management facility 102 may provide, for display by an access device associated with the access request, a visually dynamic representation of a plurality of subportions of a plurality of security images.

Figure 4:
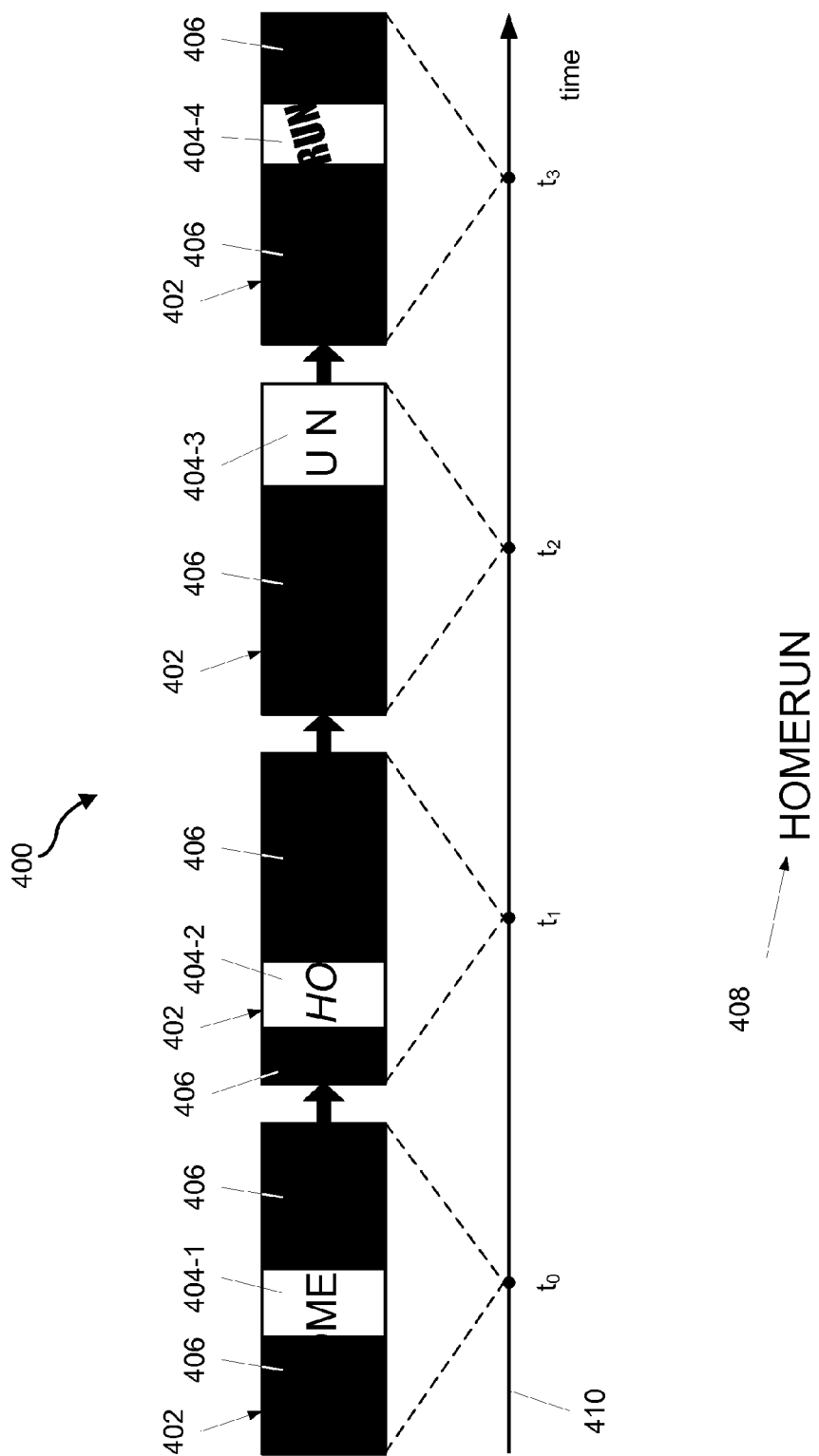

FIG. 4 illustrates an exemplary visually dynamic representation 400 of a plurality of subportions 404 (e.g., subportions 404-1 through 404-4) of a plurality of security images associated with a passcode 408. In this illustrated example, passcode 408 is "HOMERUN" and is associated with a plurality of security images graphically depicting the characters of "HOMERUN." As shown, a first subportion 404-1 of a first security image, a second subportion 404-2 of a second security image, a third subportion 404-3 of a third security image, and a fourth subportion 404-4 of a fourth security image may be provided for display by an access device within a display window 402 in turn at different times (e.g., times $t_0$, $t_1$, $t_2$, and $t_3$) along a time axis 410. The subportions 404 of the security images that are displayed within display window 402 may periodically change over time according to a display scheme (e.g., by displaying different subportions 404 at different times), as described below in more detail.

First subportion 404-1 of the first security image may be provided for display in display window 402 at time $t_0$. As shown, first subportion 404-1 of the first security image depicts only the characters "ME" of passcode 408 having a first set of design effects. While first subportion 404-1 is displayed, non-display regions 406 do not display or depict any other portion of the security image associated with passcode 408.

Second subportion 404-2 of the security image may be provided for display in display window 402 at time $t_1$. As shown, second subportion 404-2 of the security image depicts only the characters "HO" of passcode 408 having a second set of design effects. While second subportion 404-2 is displayed, non-display regions 406 do not display or depict any other portion of the security image associated with passcode 408.

Third subportion 404-3 of the security image may be provided for display in display window 402 at time $t_2$. As shown, third subportion 404-3 of the security image depicts only the characters "UN" of passcode 408 having a third set of design effects. While third subportion 404-3 is displayed, non-display region 406 does not display or depict any other portion of the security image associated with passcode 408.

Fourth subportion 404-4 of the security image may be provided for display in display window 402 at time $t_3$. As shown, fourth subportion 404-4 of the security image depicts only a portion of the characters "RUN" of passcode 408 having a fourth set of design effects. While fourth subportion 404-4 is displayed, non-display regions 406 do not display or depict any other portion of the security image associated with passcode 408.

A visually dynamic representation of subportions 404 of the plurality of security images may be provided in any manner described herein, including in accordance with any display cycles and/or display schemes as described herein.

In certain other examples of providing a visually dynamic representation of one or more security images associated with a passcode, challenge-response test management facility 102 may provide a visually dynamic representation of a plurality of subportions of a security image having one or more graphical objects representative of the passcode. The visually dynamic representation of the plurality of subportions of the security image may be provided in any suitable manner, including any of those described herein. In addition, a security question may be provided for display by the access device in conjunction with the visually dynamic representation of the plurality of subportions of the security image.

Figure 5:
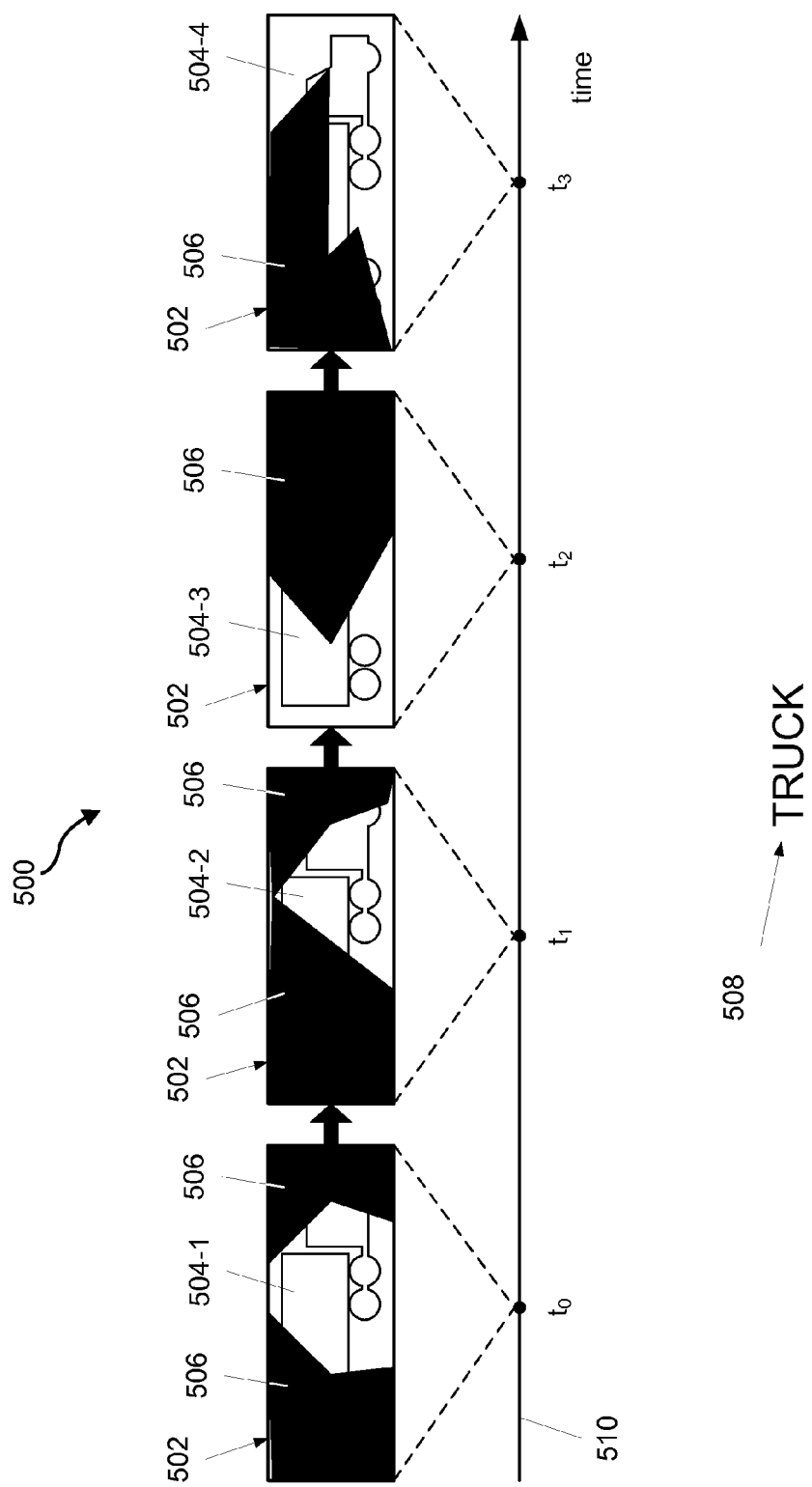

FIG. 5 illustrates an exemplary visually dynamic representation 500 of a plurality of subportions 504 (e.g., subportions 504-1 through 504-4) of a single security image having one or more graphical objects representative of a passcode 508. In this illustrated example, passcode 508 is "TRUCK" and is associated with a security image having a graphical object depicting a truck. As shown, a first subportion 504-1 of the security image, a second subportion 504-2 of the security image, a third subportion 504-3 of the security image, and a fourth subportion 504-4 of the security image may be provided for display by an access device within a display window 502 in turn at different times (e.g., times $t_0$, $t_1$, $t_2$, and $t_3$) along a time axis 510. The subportions 504 that are provided for display within display window 502 may periodically change over time according to a display scheme in any suitable manner (e.g., by displaying different subportions 504 at different times). For example, the subportions 504 may be provided for display within display window 502 in any manner described herein.

To illustrate, first subportion 504-1 of the security image may be provided for display in display window 502 at time $t_0$. As shown, first subportion 504-1 of the security image depicts only a first subportion of the truck graphically represented in the security image. While first subportion 504-1 is displayed, non-display regions 506 do not display or depict any other portion of the security image associated with passcode 508.

Second subportion 504-2 of the security image may be provided for display in display window 502 at time $t_1$. As shown, second subportion 504-2 of the security image depicts only a second subportion of the truck graphically represented in the security image. While second subportion 504-2 is displayed, non-display regions 506 do not display or depict any other portion of the security image associated with passcode 508.

Third subportion 504-3 of the security image may be provided for display in display window 502 at time $t_2$. As shown, third subportion 504-3 of the security image depicts only a third subportion of the truck graphically represented in the security image. While third subportion 504-3 is displayed, non-display region 506 does not display or depict any other portion of the security image associated with passcode 508.

Fourth subportion 504-4 of the security image may be provided for display in display window 502 at time $t_3$. As shown, fourth subportion 504-4 of the security image depicts only a fourth subportion of the truck graphically represented in the security image. While fourth subportion 504-4 is displayed, non-display regions 506 do not display or depict any other portion of the security image associated with passcode 508.

Challenge-response test management facility 102 may provide a visually dynamic representation of subportions 504 of the security image in any suitable manner, including in accordance with any of the display cycles, display schemes, and/or other manners described herein. Moreover, although FIG. 5 shows that the security image is a single security image graphically depicting a truck, the security image may also be a mosaic-type security image composed of a plurality of subportions of a plurality of security images that graphically depict different types or views of trucks, as described herein.

In certain other examples, challenge-response test management facility 102 may provide a visually dynamic representation of one or more security images associated with a passcode by providing a visually dynamic representation of a plurality of security images having one or more graphical objects representative of the passcode. For example, a first security image may be provided for display by an access device during a first time segment and a second security image may be provided for display by the access device during a second time segment. The first security image may differ from the second security image by design effects and/or by the underlying image.

Figure 6:
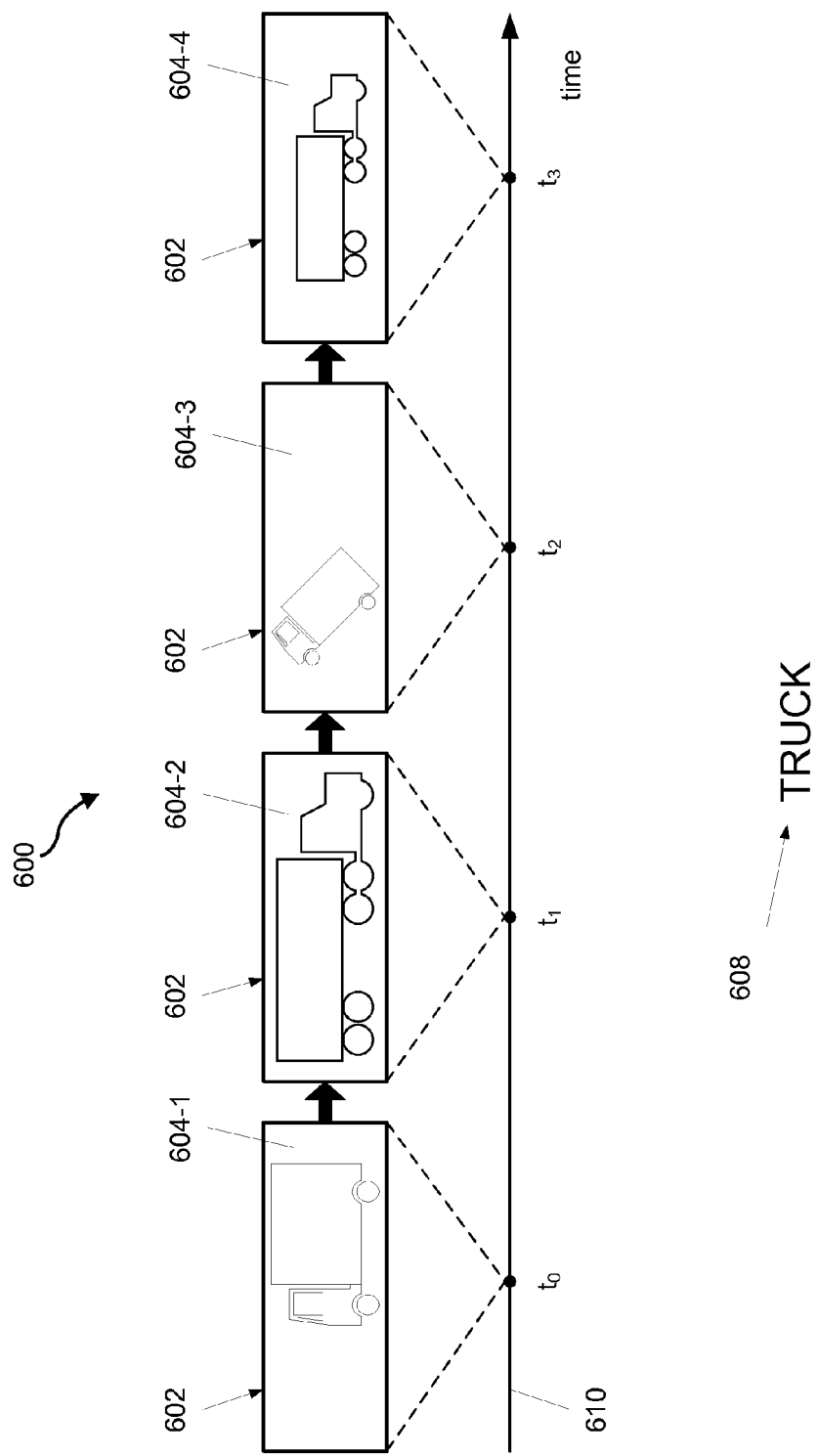

FIG. 6 illustrates an exemplary visually dynamic representation 600 of a plurality of security images 604 (e.g., security images 604-1 through 604-4) having one or more graphical objects representative of a passcode 608. In this illustrated example, passcode 608 is "TRUCK" and is associated with a plurality of security images 604 graphically depicting a truck. As shown, a first security image 604-1, a second security image 604-2, a third security image 604-3, and a fourth security image 604-4 may be provided for display by an access device within a display window 602 in turn at different times (e.g., times $t_0$, $t_1$, $t_2$, and $t_3$) along a time axis 610. The security images 604 that are displayed within display window 602 may periodically change over time according to one or more display cycles and/or display schemes (e.g., by displaying different security images 604 at different times), as described herein.

In the example of FIG. 6, first security image 604-1 may be provided for display in display window 602 at time $t_0$. As shown, first security image 604-1 depicts a first graphical object representing a truck. Second security image 604-2 may be provided for display in display window 602 at time $t_1$. As shown, second security image 604-2 depicts a second graphical object representing a truck. Third security image 604-3 may be provided for display in display window 602 at time $t_2$. As shown, third security image 604-3 depicts the first graphical object representing the truck with size decrease and rotation design effects. Fourth security image 604-4 may be provided for display in display window 602 at time $t_3$. As shown, fourth security image 604-4 depicts the second graphical object representing the truck with a size decrease design effect.

In certain other examples of providing a visually dynamic representation of one or more security images having one or more graphical objects representing the passcode, a combination of any of the above-described embodiments may be used. For example, challenge-response test management facility 102 may provide, for display by an access device associated with an access request, a visually dynamic representation of a plurality of subportions of a plurality of security images having one or more graphical objects representing the passcode.

Figure 7:
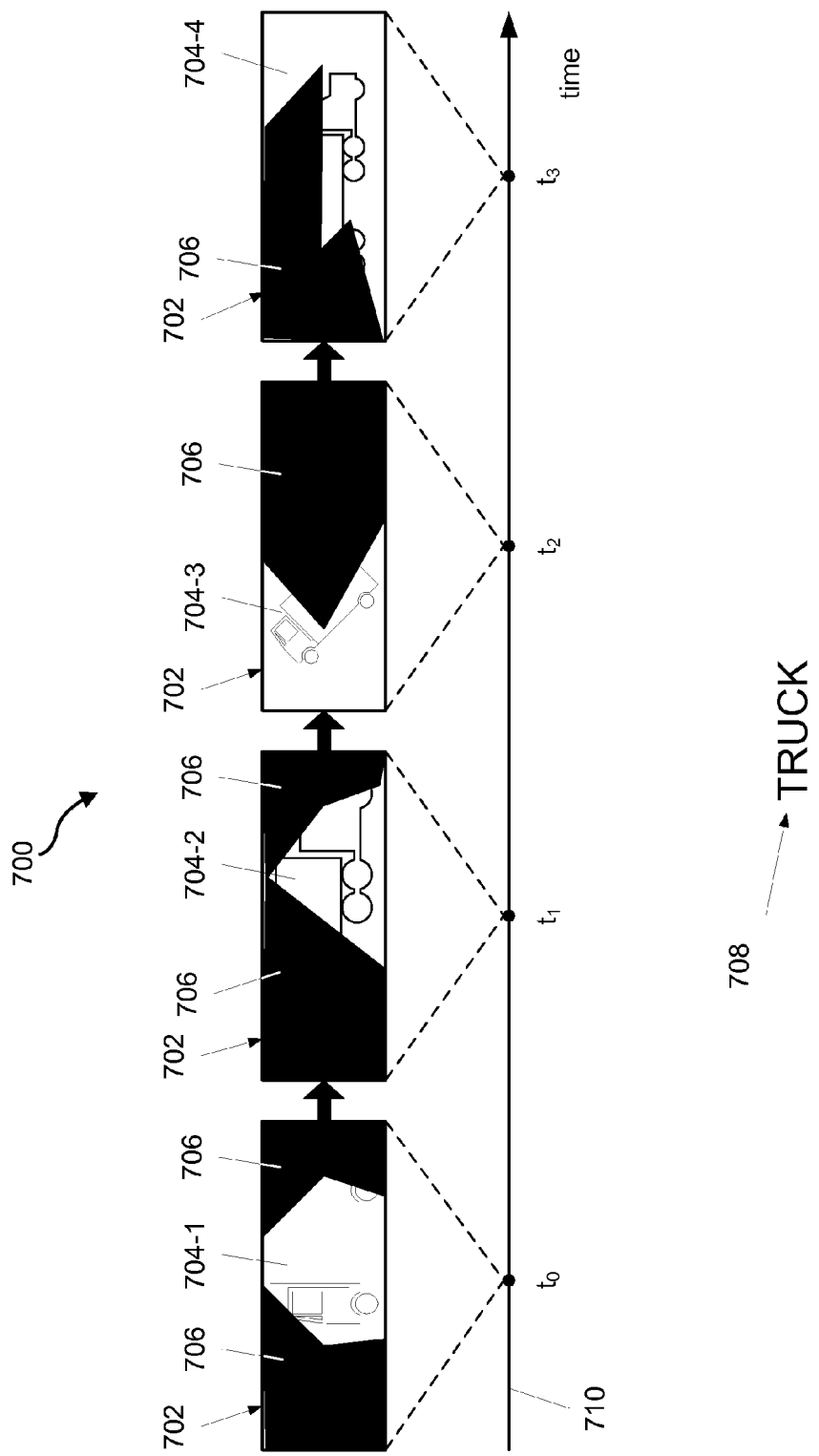

FIG. 7 illustrates an exemplary visually dynamic representation 700 of a plurality of subportions 704 (e.g., subportions 704-1 through 704-4) of a plurality of security images having one or more graphical objects representing a passcode 708. In this illustrated example, passcode 708 is "TRUCK" and is associated with a plurality of security images having graphical objects depicting a truck. As shown, a first subportion 704-1 of a first security image, a second subportion 704-2 of a second security image, a third subportion 704-3 of a third security image, and a fourth subportion 704-4 of a fourth security image may be provided for display by the access device within a display window 702 in turn at different times (e.g., times $t_0$, $t_1$, $t_2$, and $t_3$) along a time axis 710. The subportions 704 that are provided for display within display window 702 may periodically change over time according to a display scheme in any suitable manner (e.g., by displaying different subportions 704 at different times). For example, the subportions 704 may be provided for display within display window 702 in any manner described herein.

To illustrate, first subportion 704-1 of the first security image may be provided for display in display window 702 at time $t_0$. As shown, first subportion 704-1 of the first security image depicts only a subportion of the truck graphically represented in the first security image. While first subportion 704-1 is displayed, non-display regions 706 do not display or depict any other portion of the first security image associated with passcode 708.

Second subportion 704-2 of the second security image may be provided for display in display window 702 at time $t_1$. As shown, second subportion 704-2 of the second security image depicts only a subportion of the truck graphically represented in the second security image. While second subportion 704-1 is displayed, non-display regions 706 do not display or depict any other portion of the second security image associated with passcode 708.

Third subportion 704-3 of the third security image may be provided for display in display window 702 at time $t_2$. As shown, third subportion 704-3 of the third security image depicts only a subportion of the truck graphically represented in the third security image. While third subportion 704-1 is displayed, non-display region 706 does not display or depict any other portion of the third security image associated with passcode 708.

Fourth subportion 704-4 of the fourth security image may be provided for display in display window 702 at time $t_3$. As shown, fourth subportion 704-4 of the fourth security image depicts only a subportion of the truck graphically represented in the fourth security image. While fourth subportion 704-1 is displayed, non-display regions 706 do not display or depict any other portion of the fourth security image associated with passcode 708.

The visually dynamic representation of subportions 704 of the security image may be provided in any suitable manner, including in accordance with any of the display cycles, display schemes, and/or manners described herein.

By providing, for display by an access device, a visually dynamic representation of one or more security images associated with a passcode in any of the manners described herein, challenge-response test management facility 102 may solicit and receive challenge-response input associated with the visually dynamic representation of the one or more security images (e.g., a passcode guess). Challenge-response test management facility 102 may manage access to network-based content by performing one or more access operations based on the challenge-response input.

For example, challenge-response test management facility 102 may receive, from the access device associated with the access request, challenge-response input associated with the visually dynamic representation of the one or more security images provided by the challenge-response test management facility 102 for display by the access device. Challenge-response input associated with the visually dynamic representation of the one or more security images may include one or more passcode guesses received by way of or provided by the access device during any part of, or after termination of, the visually dynamic representation of the one or more security images. The challenge-response input may be inputted by a human user in any suitable manner as may suit a particular implementation, or it may be generated by a non-human entity such as a bot or other software application running on the access device. Data representative of the challenge-response input may then be transmitted from the access device to challenge-response test management facility 102 for use by challenge-response test management facility 102 in determining one or more access operations to be performed.

Challenge-response test management facility 102 may compare the challenge-response input with passcode data 110 representative of the security passcode associated with the one or more security images. If the received challenge-response input matches the passcode data 110 representative of the security passcode, challenge-response test management facility 102 may allow and/or provide access to the network-based content by way of the access device associated with the access request.

On the other hand, if the received challenge-response input associated with the one or more security images does not match the passcode data 110 representative of the security passcode, challenge-response test management facility 102 may deny access to the network-based content for the access device. Additionally or alternatively, challenge-response test management facility 102 may provide another visually dynamic representation of one or more other security images associated with another passcode. Additionally or alternatively, challenge-response test management facility 102 may lock out or temporarily block the user or software application running on the access device from retrying (i.e., providing another challenge-response input associated with the visually dynamic representation of the one or more security images) for a predetermined amount of time (e.g., ten seconds). Additionally or alternatively, challenge-response test management facility 102 may clear a challenge-response input field and allow the human user or non-human entity or software application running on the access device to provide another challenge-response input associated with the visually dynamic representation of the one or more security images. Challenge-response test management facility 102 may limit a number of retries that a user or non-human entity is permitted. The above-described access operations may be performed by challenge-response test management facility 102 at any suitable time, including after all of the challenge-response input is received or after a pre-defined number of characters are received and determined to not match the corresponding first characters of the passcode. For example, if the passcode is "HOMERUN," any of the denial access operations may be performed if all or any of the first three characters included in the challenge-response input do not match the characters "HOM."

In any of the examples described herein, a visually dynamic representation of one or more security images may be controlled, at least in part, by one or more triggers. A trigger may be any input received by way of the access device associated with the access request.

To illustrate, in certain examples, a visually dynamic representation of one or more security images may be provided in response to a user input, e.g., a user selection of a "play" or "replay" button. In response to the user input, a first display cycle or any subsequent display cycle may be provided. Additionally or alternatively, a visually dynamic representation may be provided only when a cursor or pointer is placed at (e.g. "moused over") a specified location within a graphical user interface displayed by the access device.

Additionally or alternatively, a visually dynamic representation of the one or more security images may be provided in stages as challenge-response input associated with the visually dynamic representation of the one or more security images is received. For example, subportions of a security image that are provided for display by the access device may depict only a portion of the security image until the associated fragment of the passcode is correctly input. For example, as shown in FIG. 2, a visually dynamic representation of subportions 204-1 and 204-2 may be provided until the challenge-response input matches "HOME." Then, a visually dynamic representation of subportions 204-3 and 204-4 may be provided until the challenge-response input matches "HOMERUN." In this way, additional fragments of the security image are progressively provided when challenge-response input associated with the plurality of subportions of the security image matches the corresponding fragments of the passcode.

Additionally or alternatively, the plurality of subportions 204 that are provided for display by the access device may depict a fragment of the security image at differing locations within display window 202. For example, at a time to a fragment of the security image that includes the characters "HOME" may be depicted by subportions of the security image that are positioned in the center of display window 202, and at a time $t_1$ the fragment of the security image that includes the characters "HOME" may be depicted by subportions of the security image that are positioned in the upper right corner of display window 202. The position of the subportions that depict the fragment of the security image may change in response to receiving a portion of the challenge-response input associated with the plurality of subportions of the security image.

Figure 8:
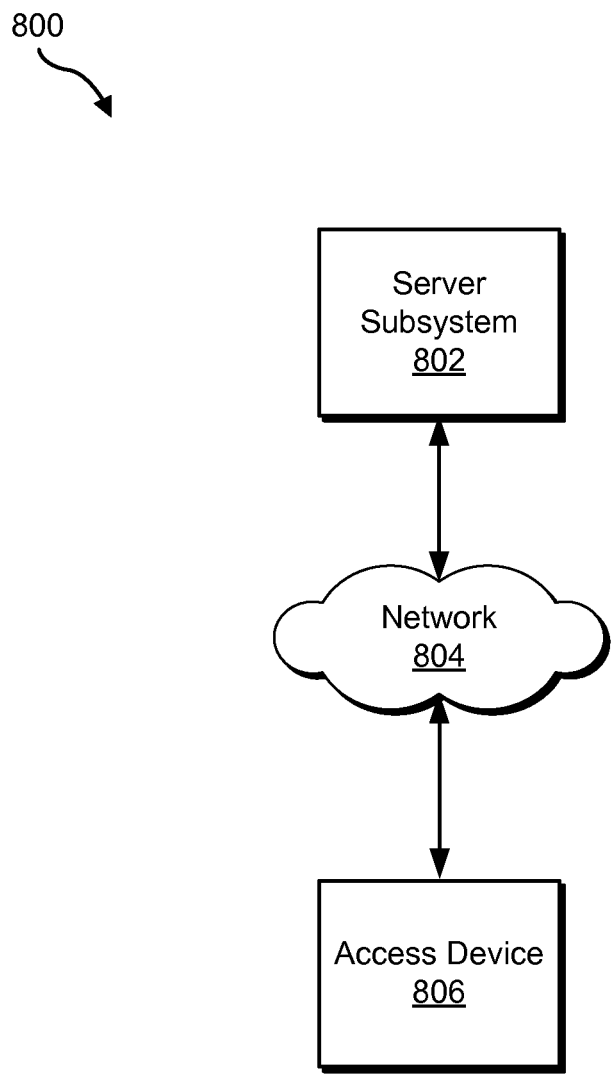
FIGS. 8-9 illustrate exemplary implementations of the system of FIG. 1 according to principles described herein.

FIG. 8 illustrates an exemplary implementation 800 of system 100 in which a server subsystem 802 and an access device 806 are communicatively coupled via a network 804. In certain examples, components of system 100 may be implemented entirely by or within server subsystem 802 or access device 806. In other examples, components of system 100 may be distributed across server subsystem 802 and access device 806. For example, access device 806 may include a client (e.g., a client application) implementing one or more of the facilities of system 100.

Server subsystem 802 and access device 806 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Long Term Evolution ("LTE") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Challenge-response test management facility 102 may facilitate communication between server subsystem 802 and access device 806. In particular, challenge-response test management facility 102 may transmit and/or receive communication signals, security image data, security image metadata, passcode data, and/or any other data to/from server subsystem 802. The communication signals may be in any form suitable for communicating with one or more computing devices. Challenge-response test management facility 102 may interface with any suitable communication media, protocols, and formats, including any of those mentioned above. Challenge-response test management facility 102 may include and/or employ any technologies suitable for transmitting and/or receiving communication signals associated with any type and/or form of inter-device communications.

Server subsystem 802 and access device 806 may communicate using any suitable network. For example, as shown in FIG. 8, server subsystem 802 and access device 806 may communicate with each other by way of network 804. Network 804 may include one or more networks or types of networks capable of carrying communications and/or data signals between or among server subsystem 802 and access device 806. For example, network 804 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, a wide area network, any other suitable network, and/or any combination or sub-combination of these networks. Communications between server subsystem 802 and access device 806 may be transported using any one of the above-listed networks, or any combination or sub-combination of the above-listed networks.

While FIG. 8 shows server subsystem 802 and access device 806 communicatively coupled via network 804, it will be recognized that server subsystem 802 and access device 806 may be configured to communicate one with another in any other suitable manner (e.g., via a direct connection).

Server subsystem 802 and access device 806 may each include or be implemented by one or more computing devices, such as one or more servers, a mobile or wireless device (e.g., a mobile phone, a smartphone, a handheld device, a tablet computer, a laptop computer, a personal-digital assistant device, etc.), a personal computer, a set-top box device, a digital video recorder ("DVR") device, a gaming device, a television device, a network-based computing device (e.g., one or more network-based servers), and/or any other device configured to perform one or more of the processes and/or operations described herein.

Server subsystem 802 may provide network-based content for access by access device 806 and control access by access device 806 to the network-based content. For example, server subsystem 802 may maintain, in a storage repository, data representative of network-based content (e.g., a webpage or software application). Server subsystem 802 may receive, from access device 806 via network 804, a request for access to the network-based content and thereby detect the request for access. In response to detecting the request for access, server subsystem 802 may provide a challenge-response test for use in determining whether to grant or deny access to the network-based content. For example, server subsystem 802 may provide, for display by access device 806 or a display device associated with access device 806, a visually dynamic representation of one or more security images associated with a passcode, such as described herein.

Server subsystem 802 may receive, from access device 806, challenge-response input associated with the visually dynamic representation of the one or more security images. Server subsystem 802 may then compare the challenge-response input with the passcode and perform, based on the comparison, one or more access operations. For example, if the challenge-response input matches the passcode, server subsystem 802 may transmit the data representative of the network-based content to access device 806. On the other hand, if the challenge-response input does not match the passcode, server subsystem 802 may deny access to the network-based content and not transmit the data representative of the network-based content. Additionally or alternatively, server subsystem 802 may terminate the communication session with access device 806.

Access device 806 may facilitate access to network-based content provided by server subsystem 802. To this end, access device 806 may receive provide a request for network-based content. For example, a human user interacting with access device 806 may input a URL address or select a displayed hyperlink in a browser application running on access device 806. In response to the input, access device 806 may transmit a request for access to server subsystem 802 via network 804 to request access to the network-based content provided by server subsystem 802. Access device 806 may then receive, from server subsystem 802, security image data and use the security image data to display the visually dynamic representation of the one or more security images associated with a passcode. During or after the visually dynamic representation, access device 806 may receive the challenge-response input associated with the visually dynamic representation of the one or more security images and transmit data representative of the challenge-response input to server subsystem 802 for use by server subsystem 802 in determining an access operation to perform.

If a human user is interacting with access device 806, input requesting network-based content and the challenge-response input associated with the visually dynamic representation of the one or more security images may be provided by the human user by way of access device 806. In this way, a human user viewing the visually dynamic representation of the one or more security images displayed by access device 806 may ascertain the passcode and enter the correct passcode as the challenge-response input. On the other hand, if a non-human entity such as a bot or other automated script running on access device 806 requested access to the network-based content, the non-human entity may not be able to interpret the visually dynamic representation displayed by access device 806. As a result, the non-human entity is more likely to provide challenge-response input that does not match the passcode. In this way, server subsystem 802 may control (e.g., allow or deny) access to network-based content based on the type of user or entity interacting with access device 806.

Figure 9:
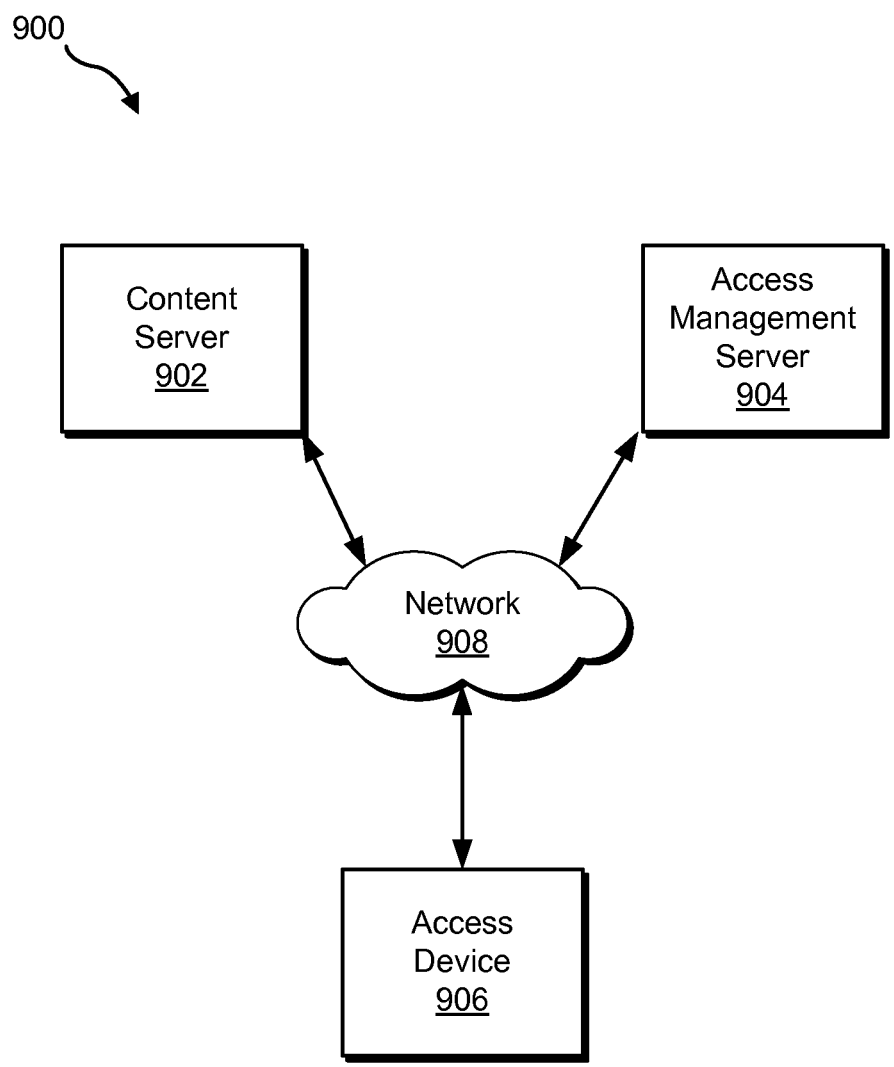

FIG. 9 shows another exemplary implementation 900 of system 100 in which a content server 902, an access management server 904, and an access device 906 are communicatively coupled via a network 908. Access device 906 and network 908 may be and/or function similarly to access device 806 and network 804 of FIG. 8. Content server 902 may maintain and provide network-based content for access over network 908. Access management server 904 may manage or assist with management of access to the network-based content provided by content server 902. For example, access management server 904 may provide a challenge-response test for use by content server 902 to identify an access operation to perform in response to a request for access to network-based content. In certain examples, access management server 904 and content server 902 may be separate and independent (e.g., autonomous) in that they do not communicate directly with one another except by way of network 908 and/or are managed by independent entities, departments, and/or personnel.

In certain examples, access management server 904 may transmit a challenge-response test to content server 902 for use by content server 902. For example, when content server 902 receives an access request from access device 906, content server 902 may request a challenge-response test from access management server 904 by transmitting the access request or a notification of the access request to access management server 904. By receiving the access request or the notification of the access request, access management server 904 may detect the access request by access device 906. Access management server 904 may transmit all or a part of the challenge-response test to content server 902. For example, access management server 904 may transmit one or more security images to content server 902. Additionally, access management server 904 may transmit a passcode associated with the one or more security images to content server 902. Content server 902 may then provide a visually dynamic representation of the one or more security images for display by access device 906.

In other examples, access management server 904 may provide the visually dynamic representation of the one or more security images directly to access device 906 by way of network 908 for display by access device 906 upon detecting the access request by access device 906. Challenge-response input may then be transmitted by way of network 908 back to access management server 904 to compare with the passcode associated with the one or more security images. Access management server 904 may transmit the results of the comparison to content server 902 (e.g., passcode matched or passcode not matched), and content server 902 may process the results to identify one or more access operations to perform.

Alternatively, access management server 904 may transmit one or more access operation instructions to content server 902, the access operation instructions being based on the results of the comparison. For example, access management server 904 may instruct content server 902 to allow access device 906 to access to the network-based content.

In certain examples, content server 902 and access management server 904 may be associated with (e.g., operated by and/or under the control of) a single party, such as a network-based content provider that provides network-based content to end users. In other examples, content server 902 and access management server 904 may be associated with (e.g., operated by and/or under the control of) different parties. For example, content server 902 may be associated with a network-based content provider that provides network-based content to end users, and access management server 904 may be associated with a third-party human verification service provider (e.g., a challenge-response test provider).

Figure 10:
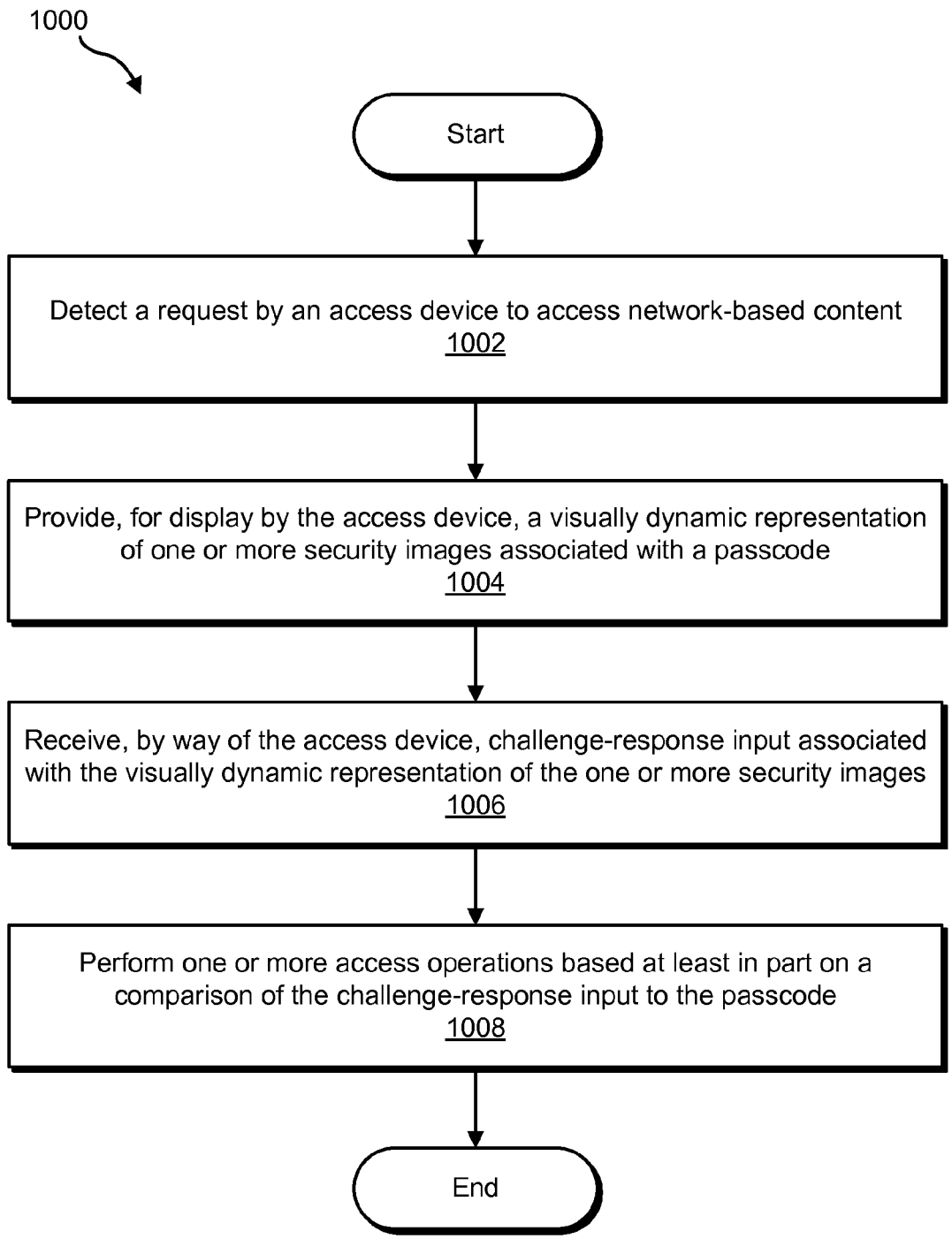
FIGS. 10-12 illustrate exemplary methods of verifying human interaction with a computer interface according to principles described herein.

FIG. 10 illustrates an exemplary method 1000 of verifying human interaction with a computer interface. While FIG. 10 illustrates exemplary steps according to one embodiment, other embodiments may omit, add to, reorder, and/or modify any of the steps shown in FIG. 10. One or more of the steps shown in FIG. 10 may be performed by one or more components of human-interaction verification system 100 and/or any implementation thereof.

In step 1002, a human-interaction verification system detects a request by an access device to access network-based content. Step 1002 may be performed in any of the ways described herein.

In step 1004, the human-interaction verification system provides, for display by the access device, a visually dynamic representation of one or more security images associated with a passcode. Step 1004 may be performed in any of the ways described herein.

In step 1006, the human-interaction verification system receives, by way of the access device, challenge-response input associated with the visually dynamic representation of the one or more security images. Step 1006 may be performed in any of the ways described herein.

In step 1008, the human-interaction verification system performs one or more access operations based at least in part on a comparison of the challenge-response input to the passcode. Step 1008 may be performed in any of the ways described herein.

Figure 11:
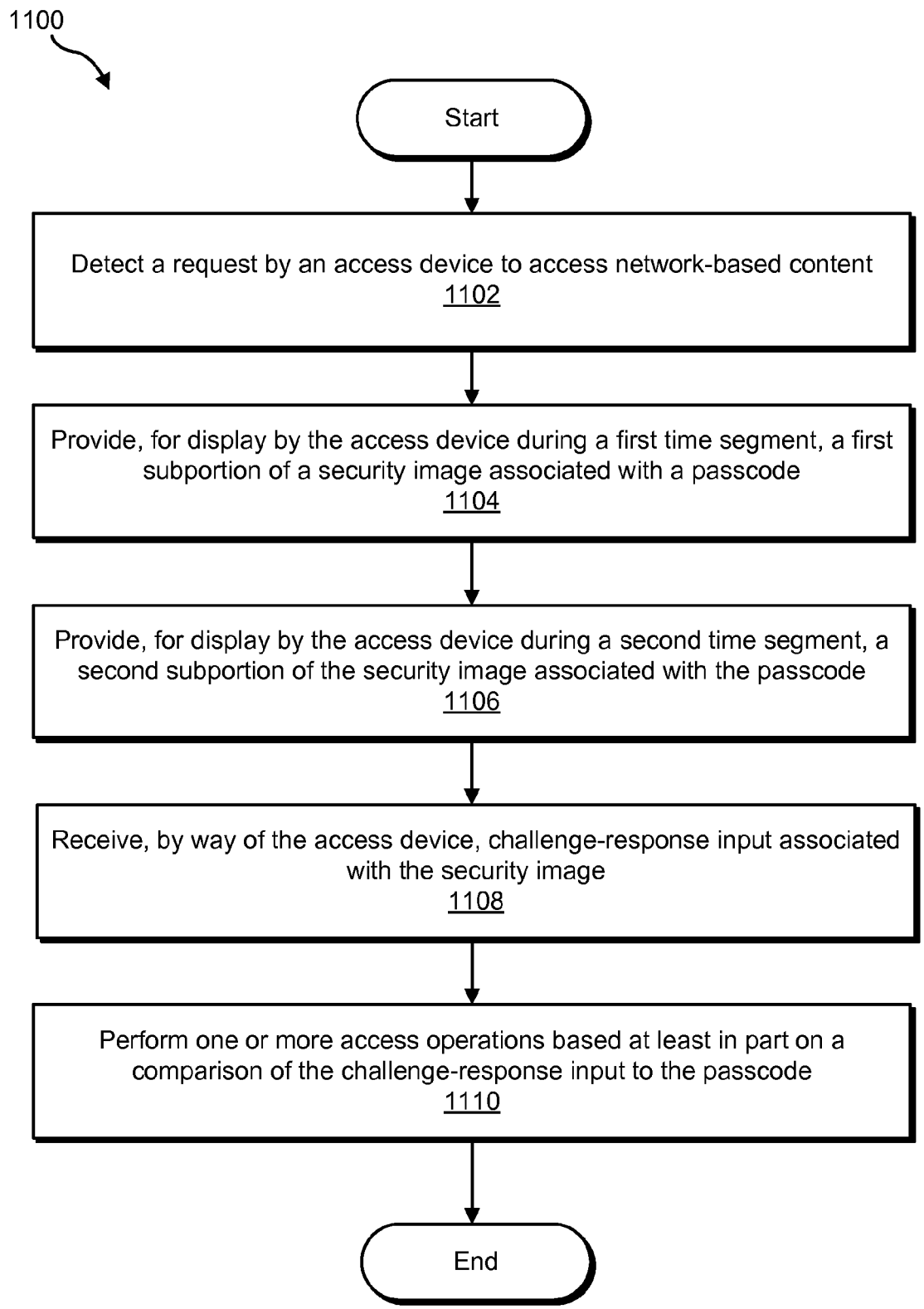

FIG. 11 illustrates another exemplary method 1100 of verifying human interaction with a computer interface. While FIG. 11 illustrates exemplary steps according to one embodiment, other embodiments may omit, add to, reorder, and/or modify any of the steps shown in FIG. 11. One or more of the steps shown in FIG. 11 may be performed by one or more components of human-interaction verification system 100 and/or any implementation thereof.

In step 1102, a human-interaction verification system detects a request by an access device to access network-based content. Step 1102 may be performed in any of the ways described herein.

In step 1104, the human-interaction verification system provides, for display by the access device during a first time segment, a first subportion of a security image associated with a passcode. Step 1104 may be performed in any of the ways described herein.

In step 1106, the human-interaction verification system provides, for display by the access device during a second time segment, a second subportion of the security image associated with the passcode. Step 1106 may be performed in any of the ways described herein.

In step 1108, the human-interaction verification system receives, by way of the access device, challenge-response input associated with the security image. Step 1108 may be performed in any of the ways described herein.

In step 1110, the human-interaction verification system performs one or more access operations based at least in part on a comparison of the challenge-response input associated with the security image to the passcode. Step 1110 may be performed in any of the ways described herein.

Figure 12:
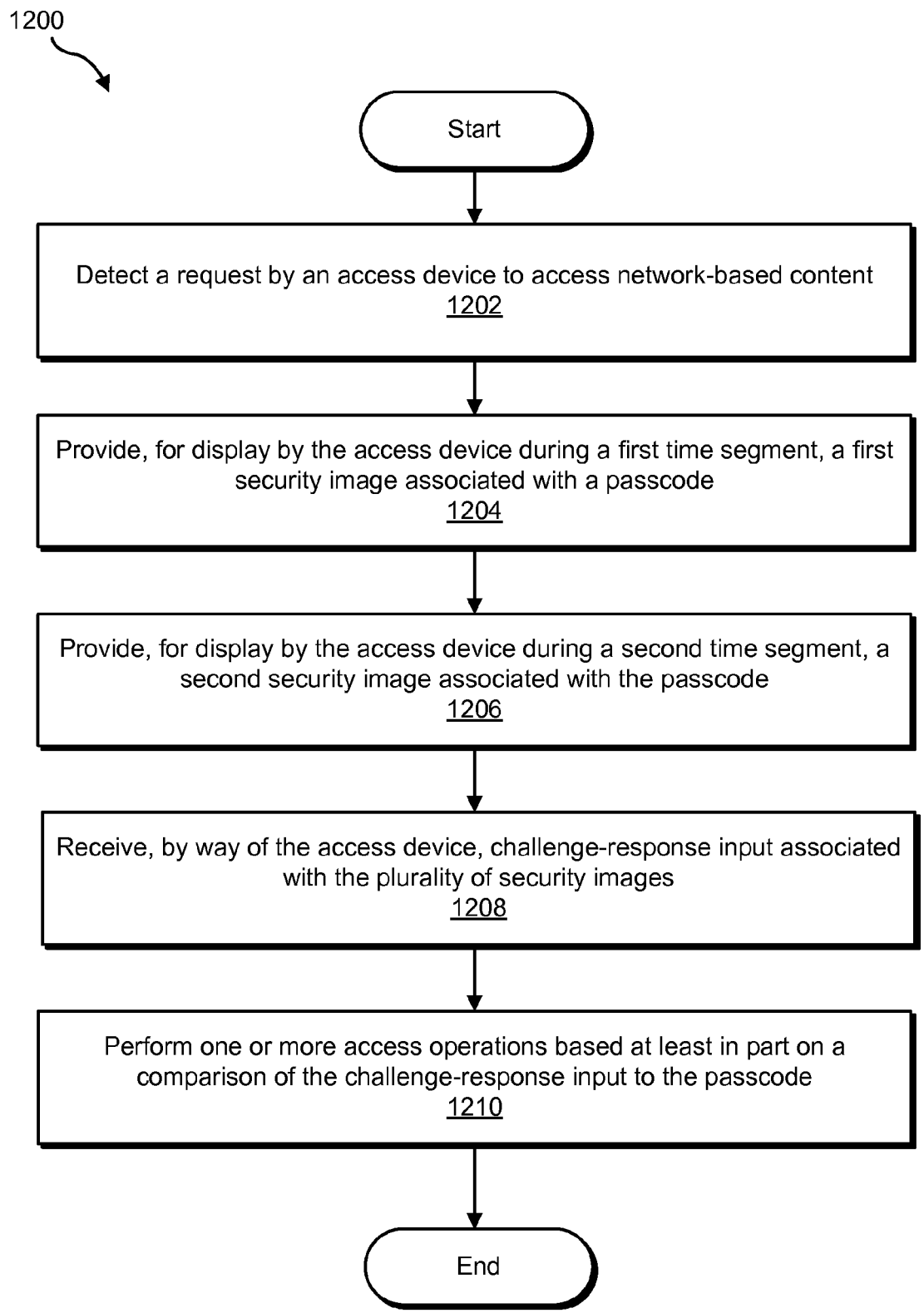

FIG. 12 illustrates another exemplary method 1200 of verifying human interaction with a computer interface. While FIG. 12 illustrates exemplary steps according to one embodiment, other embodiments may omit, add to, reorder, and/or modify any of the steps shown in FIG. 12. One or more of the steps shown in FIG. 12 may be performed by one or more components of human-interaction verification system 100 and/or any implementation thereof.

In step 1202, a human-interaction verification system detects a request by an access device to access network-based content. Step 1202 may be performed in any of the ways described herein.

In step 1204, the human-interaction verification system provides, for display by the access device during a first time segment, a first security image associated with a passcode. Step 1204 may be performed in any of the ways described herein.

In step 1206, the human-interaction verification system provides, for display by the access device during a second time segment, a second security image associated with the passcode. Step 1206 may be performed in any of the ways described herein.

In step 1208, the human-interaction verification system receives, by way of the access device, challenge-response input associated with the first security image and/or the second security image. Step 1208 may be performed in any of the ways described herein.

In step 1210, the human-interaction verification system performs one or more access operations based at least in part on a comparison of the challenge-response input associated with the first security image and/or the second security image to the passcode. Step 1210 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 13:
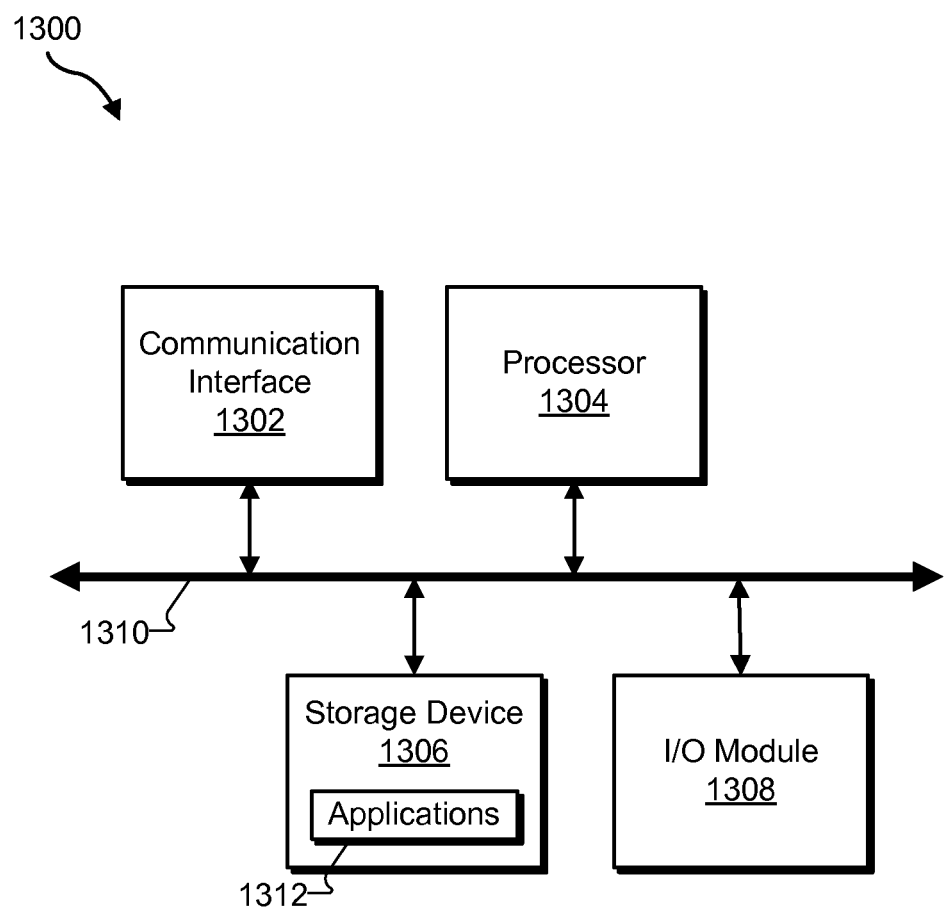
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other examples. Components of computing device 1300 shown in FIG. 13 will now be described in additional detail.

Communication interface 1302 may communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain examples, I/O module 1308 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1300. For example, one or more applications 1312 residing within storage device 1306 may direct processor 1304 to perform one or more processes or functions associated with challenge-response test management facility 102. Likewise, storage facility 104 may be implemented by or within storage device 1306.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a human-interaction verification system for display in a display window by an access device requesting access to network-based content, a visually dynamic representation of one or more security images associated with a passcode, the providing of the visually dynamic representation of the one or more security images comprising:
streaming, at or immediately prior to a first time segment, data representative of a first obfuscation image to the access device for display of the first obfuscation image in the display window during the first time segment,
streaming, at or immediately prior to a second time segment, subportion image data representative of a first subportion of the one or more security images to the access device for display of the first subportion of the one or more security images in the display window during the second time segment,
streaming, at or immediately prior to a third time segment, subportion image data representative of a second subportion of the one or more security images to the access device for display of the second subportion of the one or more security images in the display window during the third time segment, and
streaming, at or immediately prior to a fourth time segment, data representative of a second obfuscation image to the access device for display of the second obfuscation image during the fourth time segment,
receiving, by the human-interaction verification system by way of the access device, challenge-response input associated with the visually dynamic representation of the one or more security images; and
performing, by the human-interaction verification system, an access operation based at least in part on a comparison of the challenge-response input to the passcode, wherein
the second time segment and the third time segment occur between the first time segment and the fourth time segment,
the first subportion of the one or more security images and the second subportion of the one or more security images displayed temporally between the display of the first obfuscation image and the display of the second obfuscation image visually depict, in the aggregate, less than all of the one or more security images,
a plurality of subportions of the one or more security images are provided for display, over time, by the access device in accordance with a display scheme in which an attribute of the plurality of subportions of the one or more security images changes randomly during the visually dynamic representation of the one or more security images,
the attribute of the plurality of subportions comprises at least one of a shape, a size, a position, an order of display, a display duration, and a quantity of the plurality of subportions of the one or more security images, and
the one or more security images comprises a first security image including a first graphical object depicting the passcode.

2. The method of claim 1, wherein:
the one or more security images further comprises a second security image including a second graphical object depicting the passcode, the second graphical object being different from the first graphical object,
the first subportion of the one or more security images comprises a first subportion of the first security image; and
the second subportion of the one or more security images comprises a second subportion of the second security image.

3. The method of claim 1, further comprising:
determining, by the human-interaction verification system, that the challenge-response input matches the passcode;
wherein the access operation includes allowing access to the network-based content by the access device.

4. The method of claim 1, further comprising:
determining, by the human-interaction verification system, that the challenge-response input does not match the passcode;
wherein the access operation includes at least one of
denying access to the network-based content by the access device,
allowing another challenge-response input associated with the visually dynamic representation of the one or more security images,
temporarily blocking another challenge-response input associated with the visually dynamic representation of the one or more security images, and providing another visually dynamic representation of plurality of other security images associated with another passcode.

5. The method of claim 1, wherein
the one or more security images further include one or more characters representative of a security question associated with the passcode, the passcode being an answer to the security question, and
the one or more security images depict the answer to the security question.

6. The method of claim 1, further comprising:
maintaining, by the human-interaction verification system, a repository of security image data, the security image data comprising data representative of a set of security images and metadata associated with each security image included in the set of security images, the set of security images including the one or more security images;
selecting, by the human-interaction verification system, the first security image from the set of security images; and
obtaining, by the human-interaction verification system, a passcode based on metadata associated with the first security image.

7. The method of claim 1, further comprising:
maintaining, by the human-interaction verification system, a repository of passcode data, the passcode data comprising data representative of a plurality of passcodes;
selecting, by the human-interaction verification system, a passcode from the repository of passcode data; and
obtaining, by the human-interaction verification system, the one or more security images based on the selected passcode.

8. The method of claim 7, wherein the obtaining of the one or more security images based on the selected passcode comprises selecting, from a repository of security image data, one or more security images having metadata that matches the selected passcode.

9. The method of claim 1, wherein:
the display window comprises
a subportion of a security image included in the plurality of subportions of the one or more security images, and
a non-display region corresponding to a region of the security image not included in the subportion of the security image.

10. The method of claim 1, wherein the subportion image data representative of the first subportion of the one or more security images and the subportion image data representative of the second subportion of the one or more security images are streamed to the access device in accordance with the display scheme.

11. The method of claim 1, wherein the providing of the visually dynamic representation of the one or more security images further comprises transmitting, to the access device, instructions for displaying the subportion image data representative of the first subportion of the one or more security images and the subportion image data representative of the second subportion of the one or more security images in accordance with the display scheme.

12. The method of claim 1, further comprising:
receiving, by the human-interaction verification system from the access device, a request to access the network-based content,
wherein
the providing of the first subportion of the one or more security images for display during the first time segment is performed in response to the receiving of the request, and
the providing of the second subportion of the one or more security images for display during the second time segment is performed in response to receiving a portion of the challenge-response input.

13. The method of claim 1, further comprising:
receiving, by the human-interaction verification system from the access device, an access request for the network-based content;
transmitting, by the human-interaction verification system by way of a network, the access request or a notification of the access request to an access management server that is independent of the human-interaction verification system; and
receiving, by the human-interaction verification system from the access management server, the data representative of the first subportion of the one or more security images and the data representative of the second subportion of the one or more security images.

14. The method of claim 6, further comprising,
receiving, by the human-interaction verification system from a content server hosting the network-based content, a notification of an access request received by the content server for the access to the network-based content;
wherein the selecting of the first security image is performed in response to the receiving of the notification of the access request.

15. The method of claim 14, wherein the performing of the access operation comprises transmitting, to the content server, at least one of a result of the comparison of the challenge-response input to the passcode and an access operation instruction based on the result of the comparison of the challenge-response input to the passcode.

16. The method of claim 7, further comprising,
receiving, by the human-interaction verification system from a content server hosting the network-based content, a notification of an access request received by the content server for the access to the network-based content;
wherein the selecting of the passcode from the repository of passcode data is performed in response to the receiving of the notification of the access request.

17. A method comprising:
providing, by a human-interaction verification system for display in a display window by an access device requesting access to network-based content, a visually dynamic representation of a plurality of security images associated with a passcode, the providing of the visually dynamic representation of the plurality of security images comprising:
streaming, at or immediately prior to a first time segment for display in the display window during the first time segment, data representative of a first obfuscation image,
streaming, at or immediately prior to a second time segment for display in the display window during the second time segment, a first subportion of a first security image included in the plurality of security images, the first security image including a first graphical object depicting the passcode,
streaming, at or immediately prior to a third time segment for display in the display window during the third time segment, a second subportion of a second security image included in the plurality of security images, the second security image including a second graphical object depicting the passcode, wherein the second graphical object is different from the first graphical object, streaming, at or immediately prior to a fourth time segment for display during the fourth time segment, data representative of a second obfuscation image, and randomly changing an attribute of the first subportion of the first security image and the second subportion of the second security image;

receiving, by the human-interaction verification system by way of the access device, challenge-response input associated with the visually dynamic representation of the plurality of security images; and performing, by the human-interaction verification system, an access operation based at least in part on a comparison of the challenge-response input to the passcode, wherein the second time segment and the third time segment occur between the first time segment and the fourth time segment, the first subportion of the first security image and the second subportion of the second security image visually depict, in the aggregate, less than all of each of the plurality of security images, and the attribute of the first subportion of the first security image and the second subportion of the second security image comprises at least one of a shape, a size, a position, and a display duration of the first subportion of the first security image and the second subportion of the second security image.

18. A system comprising:

at least one physical computing device that:

provides, for display by an access device requesting access to network-based content, a visually dynamic representation of a one or more security images associated with a passcode by streaming, at or immediately prior to a first time segment, data representative of a first obfuscation image to the access device for display of the first obfuscation image in the display window during the first time segment, streaming, at or immediately prior to a second time segment, subportion image data representative of a first subportion of the one or more security images to the access device for display of the first subportion of the one or more security images in the display window during the second time segment, streaming, at or immediately prior to a third time segment, subportion image data representative of a second subportion of the one or more security images to the access device for display of the second subportion of the one or more security images in the display window during the third time segment, and streaming, at or immediately prior to a fourth time segment, data representative of a second obfuscation image to the access device for display of the second obfuscation image during the fourth time segment;

receives, by way of the computing device, challenge-response input associated with the one or more security images; and performs an access operation based at least in part on a comparison of the challenge-response input to the passcode, wherein the second time segment and the third time segment occur between the first time segment and the fourth time segment, the first subportion of the one or more security images and the second subportion of the one or more security images displayed temporally between the display of the first obfuscation image and the display of the second obfuscation image visually depict, in the aggregate, less than all of the one or more security images, the at least one physical computing device provides a plurality of subportions of the one or more security images for display, over time, by the access device in accordance with a display scheme in which an attribute of the plurality of subportions of the one or more security images changes randomly during the visually dynamic representation of the one or more security images, the attribute of the plurality of subportions comprises at least one of a shape, a size, a position, an order of display, a display duration, and a quantity of the plurality of subportions of the one or more security images, the one or more security images comprises a first security image including a first graphical object depicting the passcode.

* * * * *